(12) United States Patent
Sumizawa et al.

(10) Patent No.: US 7,327,366 B2
(45) Date of Patent: Feb. 5, 2008

(54) NAVIGATION APPARATUS, MAP DATA DISTRIBUTION APPARATUS, MAP DATA DISTRIBUTION SYSTEM AND MAP DISPLAY METHOD

(75) Inventors: Akio Sumizawa, Zama (JP); Wataru Oikubo, Zama (JP); Hiroshi Minagawa, Zama (JP); Kishiko Maruyama, Kokubunji (JP); Akinori Asahara, Kokubunji (JP); Atsushi Hiroike, Kokubunji (JP)

(73) Assignee: Xanavi Informatics Corporation, Zama-shi (JP)

( * ) Notice: Subject to any disclaimer, the term of this patent is extended or adjusted under 35 U.S.C. 154(b) by 29 days.

(21) Appl. No.: 11/251,764

(22) Filed: Oct. 18, 2005

(65) Prior Publication Data

US 2006/0092179 A1    May 4, 2006

(30) Foreign Application Priority Data

Oct. 18, 2004    (JP)    .............................. 2004-302967

(51) Int. Cl.
*G06T 11/20* (2006.01)

(52) U.S. Cl. ........................ 345/440; 345/441; 345/443
(58) Field of Classification Search ................ 345/440, 345/441, 443
See application file for complete search history.

(56) References Cited

U.S. PATENT DOCUMENTS

2001/0012981 A1* 8/2001 Yamashita et al. .......... 701/211
2004/0150644 A1* 8/2004 Kincaid et al. ............. 345/440
2005/0093720 A1* 5/2005 Yamane et al. ........ 340/995.13

FOREIGN PATENT DOCUMENTS

JP    11-202762 A    7/1999

* cited by examiner

*Primary Examiner*—Matthew C. Bella
*Assistant Examiner*—Mike Rahmjoo
(74) *Attorney, Agent, or Firm*—Crowell & Moring LLP

(57) ABSTRACT

A navigation apparatus includes a route searching unit that searches for a plurality of routes from a departure point to a destination and a map display control unit that displays a map of the plurality of routes searched out by the route searching unit upon a display monitor, and, if any two or more among the plurality of routes overlap upon and pass along a same road, the map display control unit displays the overlapping portions as shifted.

14 Claims, 23 Drawing Sheets

MAP AFTER ROUTE SHIFT PROCEDURE

MAP BEFORE ABRIDGEMENT

MAP AFTER ABRIDGEMENT

DIRECTION QUANTIZATION
PROCEDURE (WHEN DIVIDING
INTO TWO SECTIONS)

SELECT FURTHEST POINT
FROM LINE SEGMENT JOINING
BETWEEN END POINTS

QUANTIZE DIRECTIONS OF
LINE SEGMENTS AND OBTAIN
POINT OF INTERSECTION

CONSTRUCT LINE SEGMENTS
JOINING SELECTED POINT
AND BOTH END POINTS

DIRECTION QUANTIZATION PROCEDURE (WHEN DIVIDING INTO FOUR SECTIONS)

SELECT FURTHEST POINT FROM LINE SEGMENT IN ORDER

QUANTIZE DIRECTIONS OF LINE SEGMENTS AND OBTAIN POINTS OF INTERSECTION

PRESERVED POINT

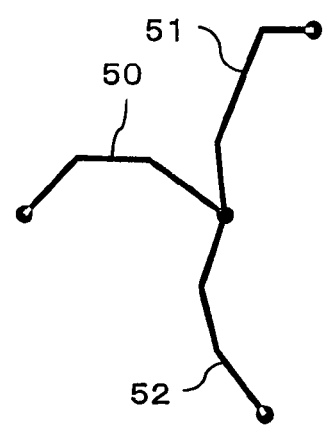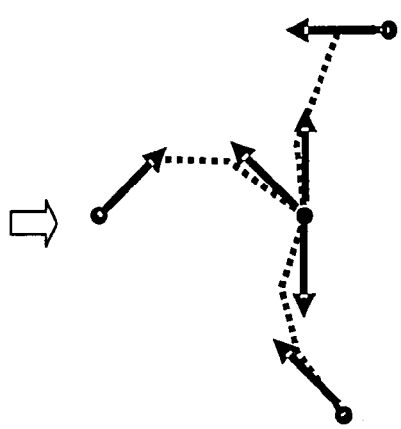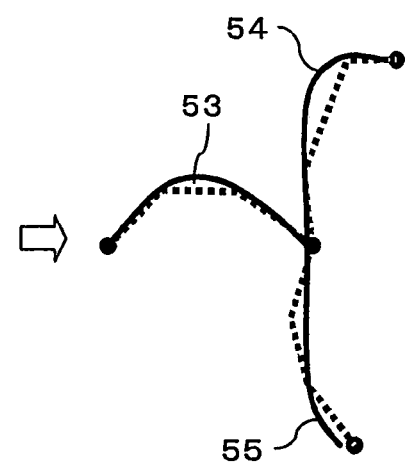
FIG. 6A  CURRENT LINK
FIG. 6B  QUANTIZATION OF LINK DIRECTIONS
FIG. 6C  APPROXIMATE CURVE

INPUT DATA

INTERNAL DATA

OUTPUT DATA

FIG. 8A

| NODE ID | N1 |
|---|---|
| COORDINATE | $(X_1, Y_1)$ |

REPRESENTATION FORMAT OF NODE DATA

FIG. 8B

| LINK ID | | L1 |
|---|---|---|
| START POINT NODE ID | | N1 |
| END POINT NODE ID | | N2 |
| NUMBER OF INTERPOLATION POINTS | | $p$ |
| INTERPOLATION POINT INFORMATION | INTERPOLATION POINT COORDINATE 1 | $(x_1, y_1)$ |
| | ... | ... |
| | INTERPOLATION POINT COORDINATE $p$ | $(x_p, y_p)$ |

REPRESENTATION FORMAT OF LINK DATA

FIG. 8C

| ROUTE ID | | | R1 |
|---|---|---|---|
| NUMBER OF ROUTE LINKS | | | $n$ |
| ROUTE LINK INFORMATION | 1 | LINK ID | L1 |
| | | DIRECTION FLAG | |
| | .. | ... | ... |
| | $n$ | LINK ID | L$n$ |
| | | DIRECTION FLAG | |

REPRESENTATION FORMAT OF ROUTE DATA

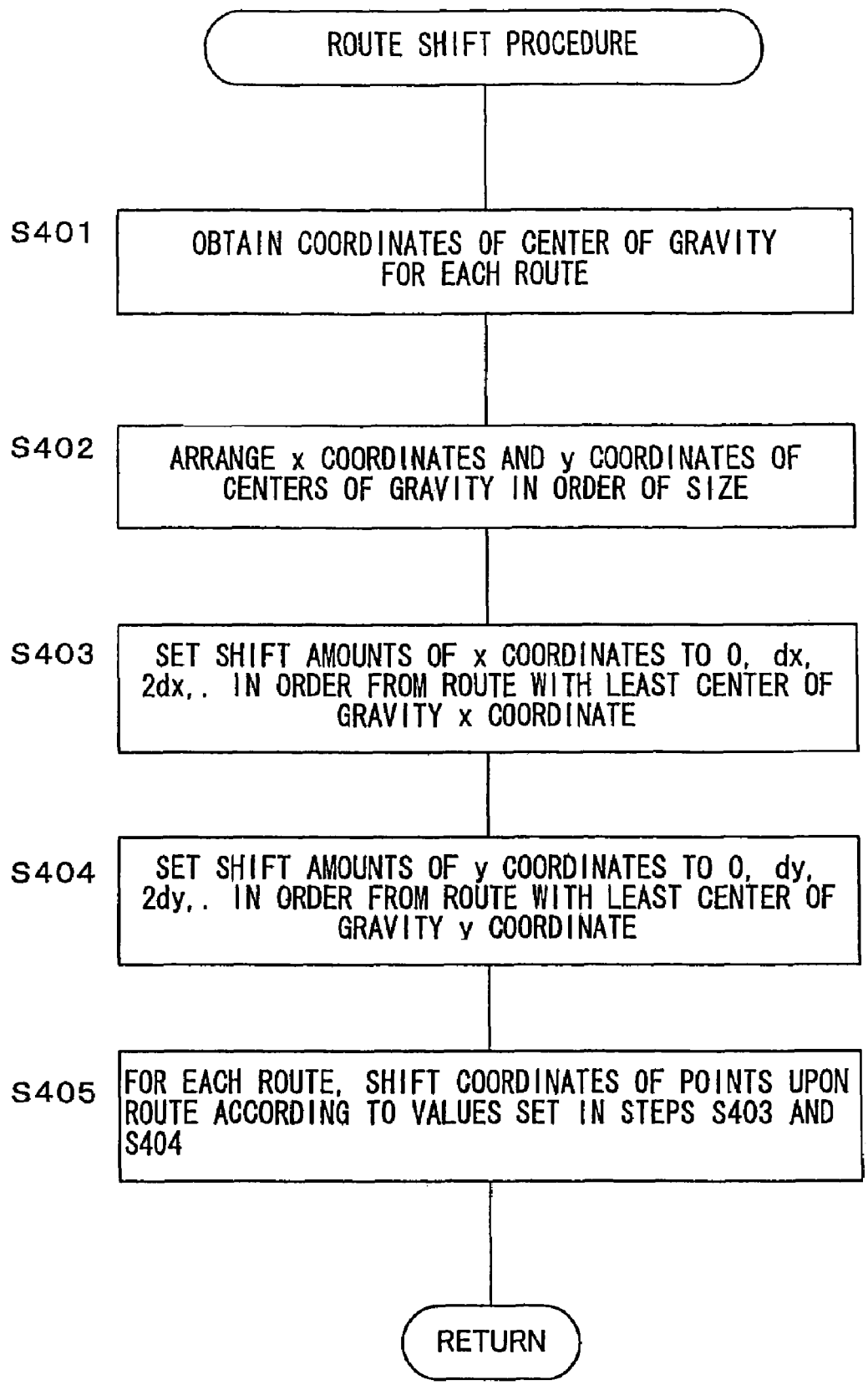

MAP BEFORE ROUTE SHIFT PROCEDURE

MAP AFTER ROUTE SHIFT PROCEDURE

MAP BEFORE ROUTE SHIFT PROCEDURE

MAP AFTER ROUTE SHIFT PROCEDURE

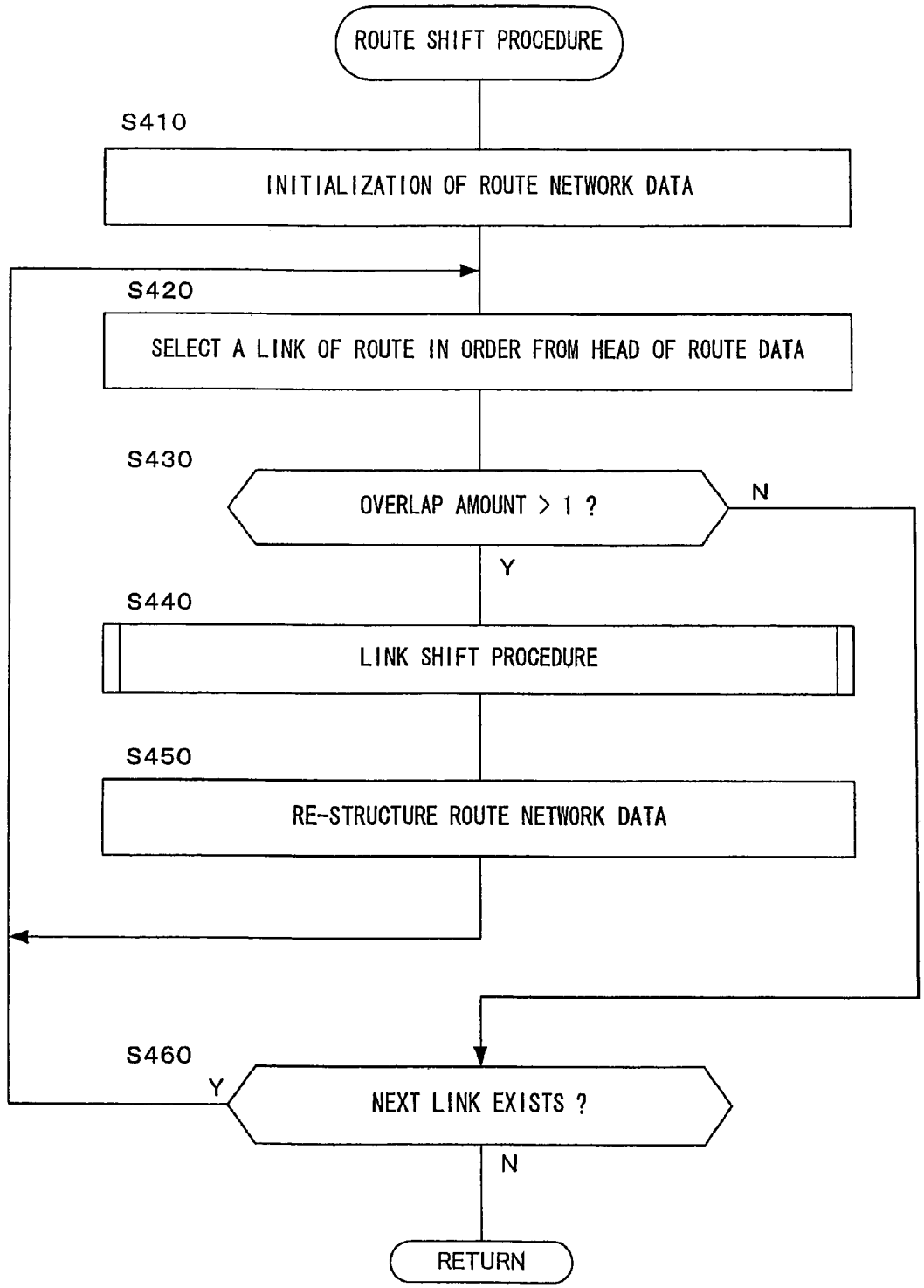

FIG. 16

BRANCHED OFF LINK SHIFT PROCEDURE

S4431
OBTAIN ANGLES FORMED BETWEEN STRAIGHT AHEAD DIRECTION AND DOWNSTREAM LINKS

S4432
TAKE ROUTE CORRESPONDING TO DOWNSTREAM LINK CLOSEST TO STRAIGHT AHEAD AS STANDARD

S4433
ARRANGE DOWNSTREAM LINKS OF RIGHTWARD DIRECTION IN ORDER OF ANGLE, AND SET SHIFT WIDTHS LIKE dw, 2dw, ...

S4434
ARRANGE DOWNSTREAM LINKS OF LEFTWARD DIRECTION IN ORDER OF ANGLE, AND SET SHIFT WIDTHS LIKE dw, 2dw, ...

S4435
CREATE COPIES OF NODES AND LINKS CORRESPONDING TO THE NUMBER OF DOWNSTREAM LINKS, AND UPDATE LINK REFERENCE RELATIONSHIPS

S4436
SHIFT CREATED COPIES ACCORDING TO RESPECTIVE VALUES SET IN STEPS S4433 AND S4434

RETURN

INPUT DATA

REPLACE INTERPOLATION POINTS WITH NODES

ESTABLISH LINK OVERLAP AMOUNTS

FIG. 19A

| NODE ID | N1 |
|---|---|
| COORDINATE | $(X_1, Y_1)$ |

REPRESENTATION FORMAT OF NODE DATA

FIG. 19B

| LINK ID | | L1 | |
|---|---|---|---|
| INITIAL VALUE OF LINK ID | | L1 | |
| START POINT NODE | | N1 | |
| END POINT NODE | | N2 | |
| OVERLAP AMOUNT | | $m$ | |
| ROUTE LINK REFERENCE INFORMATION | 1 | ROUTE ID | R1 |
| | | ROUTE LINK NUMBER | 1 |
| | ... | ... | ... |
| | $m$ | ROUTE ID | |
| | | ROUTE LINK NUMBER | |

REPRESENTATION FORMAT OF LINK DATA

FIG. 19C

| ROUTE ID | | | R1 |
|---|---|---|---|
| NUMBER OF ROUTE LINKS | | | $n$ |
| ROUTE LINK INFORMATION | 1 | LINK ID | L1 |
| | | DIRECTION FLAG | |
| | ... | ... | ... |
| | $n$ | LINK ID | L$n$ |
| | | DIRECTION FLAG | |

REPRESENTATION FORMAT OF ROUTE DATA

BRANCHED OFF LINK

CALCULATE ANGLE

SHIFT PROCEDURE

INITIAL VALUES

RESTRUCTURING (1)

RESTRUCTURING (2)

RESTRUCTURING (3)

RESTRUCTURING (4)

MAP BEFORE ROUTE SHIFT PROCEDURE

MAP AFTER ROUTE SHIFT PROCEDURE

NAVIGATION APPARATUS, MAP DATA DISTRIBUTION APPARATUS, MAP DATA DISTRIBUTION SYSTEM AND MAP DISPLAY METHOD

INCORPORATION BY REFERENCE

The disclosure of the following base priority application is hereby incorporated herein by reference: Japanese Patent Application No.2004-302967 (filed upon 18 Oct. 2004).

BACKGROUND OF THE INVENTION

1. Field of the Invention

The present invention relates to an art which displays maps for a plurality of routes from a departure point to a destination.

2. Description of Related Art

There is a known method for simplifying the shape of a road based upon map data for displaying a map. For example, with the apparatus disclosed in Japanese Patent laid-open application Publication No. 11-202762, the shape of the road is simplified by performing procedures such as straightening and orthogonalization and the like upon the links which specify the road shape in the map data, and by displaying only landmark information within a range which is regulated by a mask. A map which is easily viewed is provided by displaying a map using the road shapes which have been simplified in this manner.

However, when displaying road shapes of a plurality of routes simultaneously while simplifyng each of them with the apparatus disclosed in Japanese Patent laid-open application Publication No. 11-202762, if these routes overlap one another, then these overlapped portions may be difficult to see. Due to this, an apparatus is required which can perform display for routes in an abridged map of which the road shapes have been simplified so that a plurality thereof mutually overlap one another, so that it is possible to distinguish between the various routes in such an overlapped portion.

SUMMARY OF THE INVENTION

The navigation apparatus of the present invention includes a route searching unit that searches for a plurality of routes from a departure point to a destination, and a map display control unit that displays a map of the plurality of routes searched out by the route searching unit upon a display monitor, and, if any two or more among the plurality of routes overlap upon and pass along a same road, the map display control unit displays the overlapping portions as shifted.

In the navigation apparatus of the present invention, it is desirable that, when displaying the overlapping portions as shifted, the map display control unit shifts the entirety of each of the overlapping routes with maintaining its original shape.

In the above described navigation apparatus, it is desirable that the map display control unit sets a shift width for each of the overlapping routes based upon the coordinates of the center of gravity of each of the overlapping routes.

Furthermore, in the navigation apparatus of the present invention, when displaying the overlapping portions as shifted, the map display control unit may shift only the portions of the routes which overlap while not shifting portions other than the overlapping portions.

In the above described navigation apparatus, it is desirable that the map display control unit sets a shift width for each of the overlapping routes based upon the outward angle from the overlapping portion of the overlapping route or the inward angle towards the overlapping portion of each of the overlapping routes.

Furthermore, in the navigation apparatus of the present invention, when displaying the overlapping portions as shifted, it is desirable that the map display control unit shifts each of the routes by a predetermined width unit which is determined in advance.

The map data distribution apparatus of the present invention includes a route searching unit that searches for a plurality of routes is from a departure point to a destination, a data generation unit that generates data for display, for displaying a map of the plurality of routes searched out by the route searching unit, and a data distribution unit that distributes the data for display generated by the data generation unit to the outside, and, if any two or more among the plurality of routes overlap upon and pass along the same road, the data generation unit generates the data for display while shifting the overlapping portions.

In the map data distribution apparatus of the present invention, when generating the data for display while shifting the overlapping portions, it is desirable that the data generation unit shifts the entirety of each of the overlapping routes with maintaining its original shape.

In the above described map data distribution apparatus, it is desirable that the data generation unit sets a shift width for each of the overlapping routes based upon the coordinates of the center of gravity of the overlapping routes.

Furthermore, in the map data distribution apparatus of the present invention, when generating the data for display while shifting the overlapping portions, the data generation unit may shift only the portions of the routes which overlap, while not shifting portions other than the overlapping portions.

In the above described map data distribution apparatus, it is desirable that the data generation unit sets a shift width for each of the overlapping routes based upon the outward angle from the overlapping portion of each of the overlapping routes or upon the inward angle towards the overlapping portion of each of the overlapping routes.

Furthermore, in the map data distribution apparatus of the present invention, when displaying the overlapping portions as shifted, it is desirable that the data generation unit shifts each of the routes by a predetermined width unit which is determined in advance.

The map data distribution system of the present invention includes any of the map data distribution apparatuses described above and a map display apparatus that receives the data for display and displays a map of the plurality of routes.

The map data distribution method of the present invention include searching for a plurality of routes from a departure point to a destination and displaying a map of the plurality of routes which are searched out upon a display monitor with, if any two or more among the plurality of routes which have been searched out overlap upon and pass along a same road, the overlapping portions being shifted.

BRIEF DESCRIPTION OF THE DRAWINGS

FIGS. 6A, 6B, and 6C are figures for explanation of a method for simplifying the road shapes of routes by approximating each of the link shapes with a curve.

FIGS. 8A, 8B, and 8C are figures showing an example of a representation format for the route network data.

FIG. 9 is a flow chart of a route shift procedure which is executed in the first embodiment.

FIG. 14 is a flow chart of a route shift procedure which is executed in the second embodiment.

FIG. 16 is a flow chart of a branched off link shift procedure which is executed during the link shift procedure.

FIGS. 19A, 19B, and 19C are figures showing an example of a representation for the route network data after initialization.

DETAILED DESCRIPTION OF PREFERRED EMBODIMENTS

The First Embodiment

Figure 1:
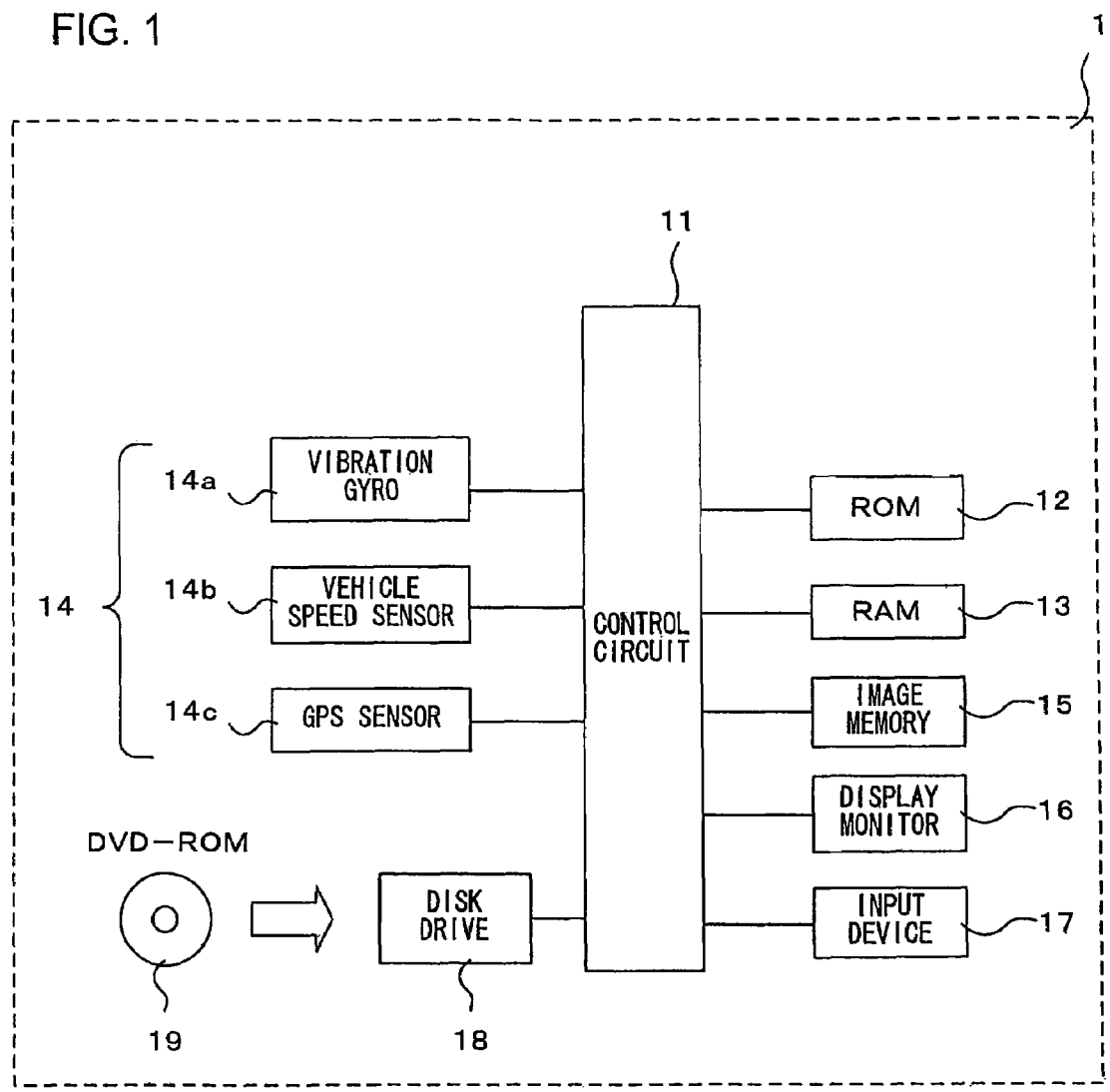
FIG. 1 is a block diagram showing the structure of a navigation apparatus according to an embodiment of the present invention.

The structure of the navigation apparatus according to an embodiment of the present invention is shown in FIG. 1. This navigation apparatus is mounted to a vehicle, and it searches out a plurality of routes to a destination which has been set, and generates and displays a map which has been abridged from a normal map (hereinafter termed an abridged map) by, for the entirety of each route, simplifying the road shapes and the like based upon the normal map. And one among the plurality of routes which have been displayed is selected by the user, and the vehicle is guided to the destination by taking this route as the recommended route. The navigation apparatus shown in FIG. 1 comprises a control circuit 11, a ROM 12, a RAM 13, a current position detection device 14, an image memory 15, a display monitor 16, an input device 17, and a disk drive 18. A DVD-ROM 19 upon which map data is recorded is loaded in the disk drive 18.

The control circuit 11 consists of a micro processor and its peripheral circuitry, and, using the RAM 13 as a work area, it performs various types of procedures and control by executing a control program which is stored in the ROM 12. By procedures which will be explained hereinafter being executed by this control circuit 11, a plurality of routes to a destination which has been set are searched out based upon the map data recorded in the DVD-ROM 19, an abridged map for the entirety of each of the routes is generated and displayed upon the display monitor 16.

The current position detection device 14 is an apparatus for detecting the current position of the vehicle, and it may comprise, for example, a vibration gyro 14a which detects the direction of progression of the vehicle, a vehicle speed sensor 14b which detects the vehicle speed, a GPS sensor 14c which detects the GPS signals from GPS satellites, and the like. Based upon the current position of the vehicle which has been detected by this current position detection device 14, the navigation apparatus 1 is able to determine the route search start point when searching for a recommended route.

The image memory 15 temporarily stores image data for display upon the display monitor 16. This image data consists of data for road map drawing and various types of diagrammatical data for image display of an abridged map and the like, and is generated by the control circuit 11, based upon the map data which is recorded on the DVD-ROM 19. An abridged map of the entirety of each of the various routes is displayed upon the display monitor 16, using this image data stored in this image memory 15.

The input device 17 has various types of input switches for the user to perform setting of the destination and the like, and this may be implemented as an operation panel or a remote controller or the like. By actuating the input device 17 according to screen instructions which are displayed upon the display monitor 16, the user can designate the name of a place or a position upon the map and set it as a destination, and can cause the navigation apparatus 1 to start searching for a route to this destination.

The disk drive 18 reads out map data which is to be used for generating an abridged map from the DVD-ROM 19 which is loaded. It should be understood that although herein, by way of example, the explanation is given in terms of the use of a DVD-ROM, it would also be acceptable to read out the map data from some other recording media other than a DVD-ROM, such as, for example, a CD-ROM or a hard disk or the like. In this map data, there may be included route calculation data which is used for calculating a plurality of routes, route guidance data such as intersection names, road names or the like, which is used for guiding the vehicle to the destination according to a recommended route which has been selected by the user, road data which specifies roads, and background data or the like which indicates map shapes other than roads, such as shorelines, rivers, railroads, various types of facilities (landmarks) upon the map, and so on.

In such road data, the minimum unit which indicates a road section is termed a link. In other words, each road is made up from a plurality of links which are set for each predetermined road section. It should be understood that the lengths of the road sections set by the links are different; the length of a link is not constant. The points which are connected together by the links are termed nodes, and each of these nodes includes position information (coordinate information). Furthermore, points which are termed shape interpolation points between one node and another may also be set within the links. Each of the shape interpolation points includes position information (coordinate information), just like the nodes. The shapes of the links, in other words the shape of the road, are determined by the position information of these nodes and shape interpolation points. Corresponding to each link described above, a value termed the link cost is set in the route calculation data for indicating the transit time required by the vehicle.

When a destination is set by operation of the user to the input device 17 as described above, the flow chart shown in FIG. 2 is executed by the control circuit 11. Due to this, calculation of route from the current position, which has been detected by the current position detection device 14 as a route search start point, to the destination which has been set is performed according to a predetermined algorithm based upon the route calculation data and a plurality of routes to the destination are obtained. An abridged map of the entirety of each of the routes which have been obtained in this manner is generated based upon the road data, and is displayed upon the display monitor 16.

The flow chart of FIG. 2 will now be explained in the following. In a step S100, the destination for route searching is set according to the destination which has been inputted by the user. In a step S200, a plurality of routes are searched out from the current position of the vehicle, which is the route search point, to the destination which was set in the step S100. At this time, the route calculation is performed according to the predetermined algorithm, based upon the route calculation data, as described above. It should be understood that the current position of the vehicle is obtained by the current position detection device 14 repeatedly at fixed intervals.

Moreover, in the step S200, in order to find a plurality of routes, the route searching is performed according to various route searching conditions. For example, route searching may be performed according to a route searching condition such as toll road priority, normal road priority, distance priority, or the like, and, by obtaining the most suitable route under each condition, a plurality of routes also may be searched out. Or a plurality of routes may also be searched out by looking for routes other than the most suitable route under a single route searching condition. For example, it would be possible to find a plurality of routes with a single route searching condition by taking the route for which the total of the link costs to the destination is the smallest as the most suitable route, and by moreover obtaining a route search result which also includes routes for which the difference of the total link cost with respect to this most suitable route is within a predetermined value.

In a step S300, an abridged map generation procedure is executed upon each of the routes which was found in the step S200. The contents of the processing at this time will be explained hereinafter in detail. By this abridged map generation procedure, an abridged map is generated which shows each of the routes in its entirety, in other words from the current position to the destination.

In a step S400, a route shift procedure is executed. Here, in the abridged map which has been generated in the step S300, if any two or more among the plurality of routes which have been found are overlapping and passing through the same road, then the procedure is performed of drawing these overlapped portions in a display format such that each of these routes can be distiniguished. In concrete terms, it is made possible to distinguish the various routes by displacing (shifting) the drawing positions of their overlapped portions. It should be understood that the concrete contents of this route shift procedure will be described in detail hereinafter.

In a step S500, the abridged map of each of the routes which was generated in the step S300, and for which additionally, the drawing position of an overlapped portion has been shifted in the step S400, is displayed upon the display monitor 16. At this time, a departure point mark and a destination mark are displayed upon the departure point and upon the destination, respectively. After having performed this step S500, the flow chart of FIG. 2 terminates. By doing as has been explained above, a plurality of routes are found to the destination, and an abridged map of each of these routes, in its entirety, is displayed upon the display monitor 16.

Figure 2:
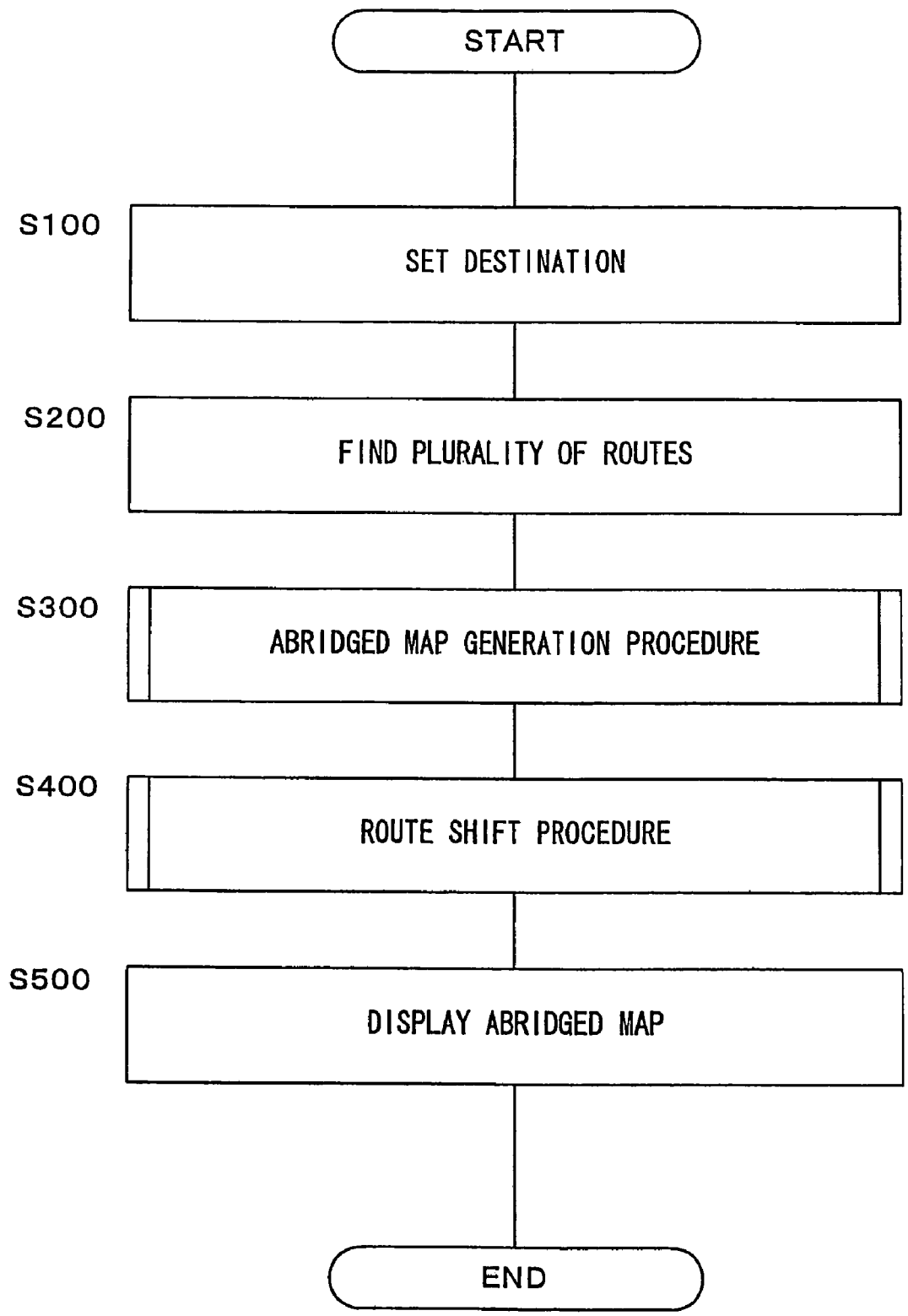
FIG. 2 is a flow chart of a procedure which is executed when searching for a plurality of routes to a destination which has been set, and displaying an abridged map of these routes.

Having executed the procedures of the flow chart of FIG. 2 and displayed an abridged map of the entirety of each of the routes upon the display monitor 16, thereafter the navigation apparatus 1 instructs the user to select one from among the routes. When any one of the routes is selected by the user actuating the input device 17, the selected route is set as the recommended route, and is displayed upon the road map of the surroundings of the current position with an indication that it is the recommended route. And the vehicle is directed according to this recommended route, and is guided to the destination. It should be understood that at this time, as a road map of the surroundings of the current position, either a normal map or an abridged map may be displayed. At this time, an abridged map may be generated by the same procedure as that of the flow chart of FIG. 2.

Figure 3A:
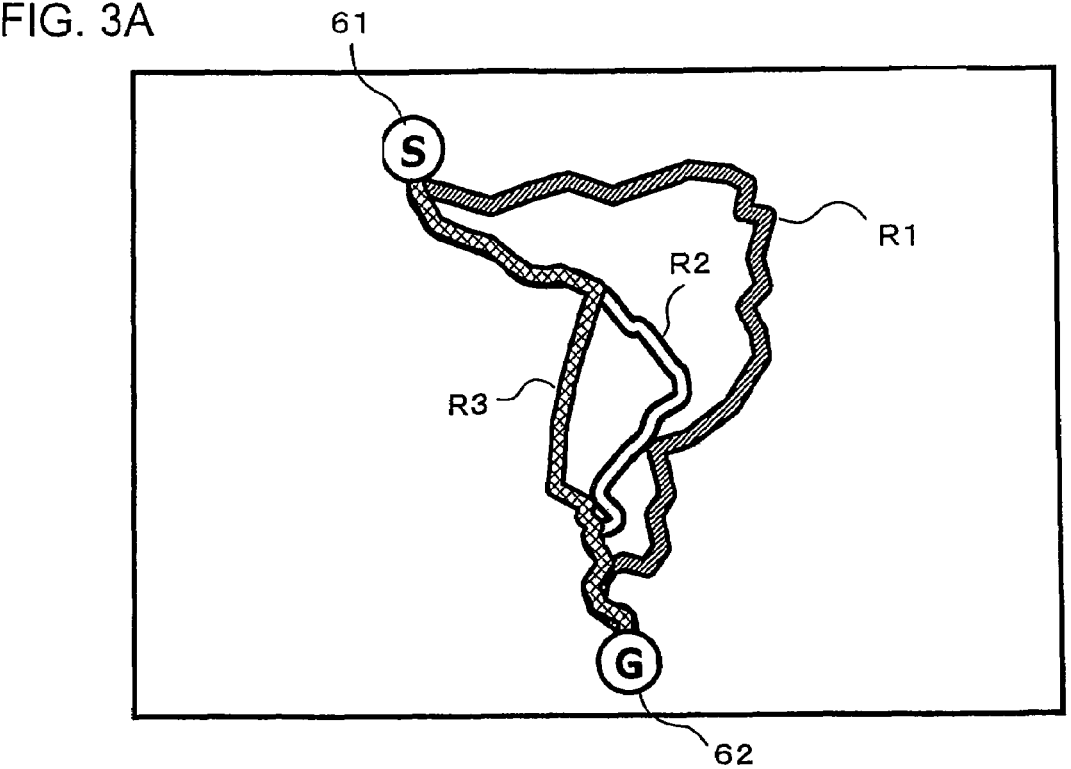
FIG. 3A is a figure showing the map before abridgement.
Figure 3B:
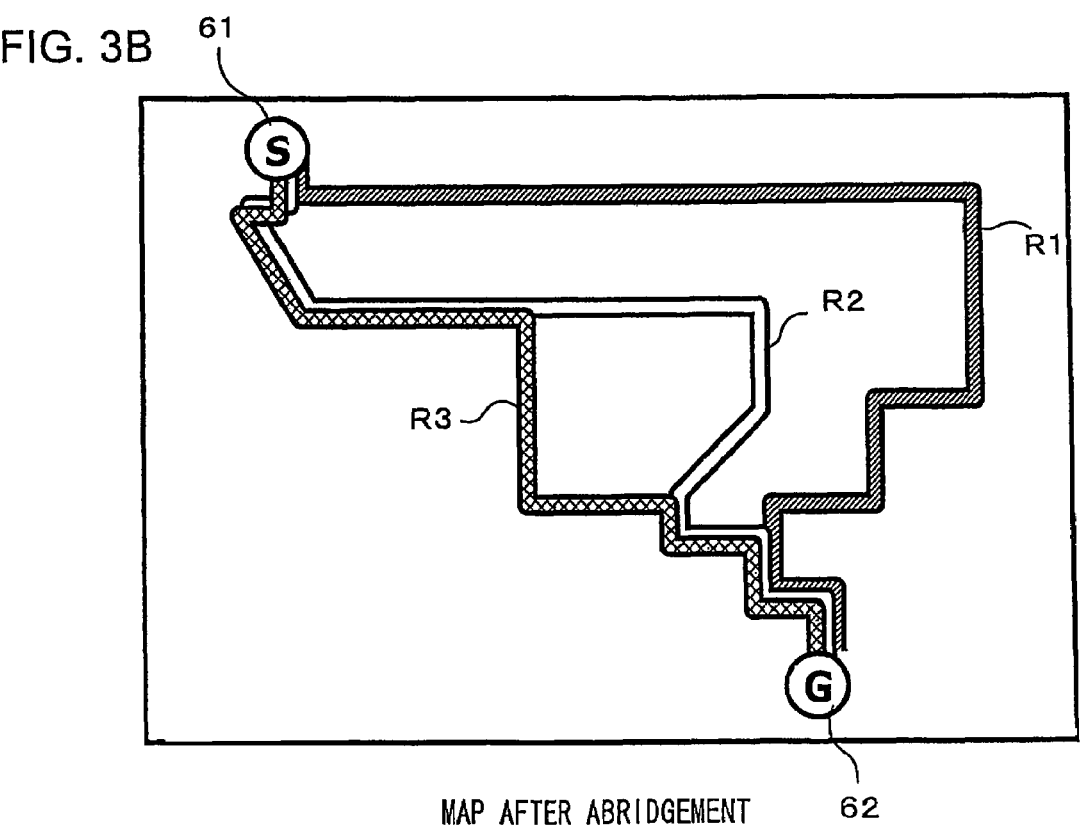
FIG. 3B is a figure showing the map after abridgement.

FIG. 3A and FIG. 3B are figures showing a normal map before abridgement, and an abridged map which has been displayed by executing the procedures of the flow chart of FIG. 2. In the map before abridgement shown in FIG. 3A, three routes R1, R2, and R3 which connect from the current position 61 to the destination 62 are shown. The abridged map of FIG. 3B is displayed by executing the procedures of the flow chart of FIG. 2 upon these routes R1~R3. It will be understood that, in this abridged map, the road shape of each of the routes R1~R3 is simplified. After having displayed the abridged map of each of the routes by doing this, whichever one of the routes has been selected is taken as the recommended route, and the vehicle is guided from the current position 61 to the destination 62.

Next, the details of the abridged map generation procedure which is executed in the step S300 will be explained. In this abridged map generation procedure, an abridged map of each of the routes is generated by simplifying the road shape of each of the routes by executing a procedure which is termed a direction quantization procedure. This direction quantization procedure will now be explained in the following.

In this direction quantization procedure, simplification of the road shapes is performed by dividing the links of each route into respective predetermined numbers of sections. Each of FIGS. 4A, 4B, 4C, and 4D, and FIGS. 5A, 5B, 5C, and 5D is a detailed explanatory figure for explaining the details of this direction quantization procedure: in FIGS. 4A~4D, the details of the direction quantization procedure are shown for the case in which the number of link sections is two (division into two sections); while, in FIGS. 5A~5D, the details of the direction quantization procedure are shown for the case in which the number of link sections is four (division into four sections). In the following, first, explanation will be provided for the case of division into two sections, shown in FIGS. 4A through 4D.

Figure 4A:
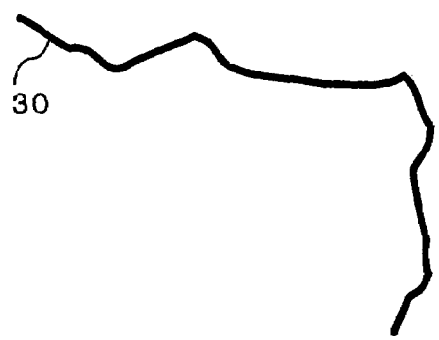
FIGS. 4A, 4B, 4C, and 4D are figures for explanation of the details of a direction quantization procedure for the case of division into is two sections, which is taken advantage of when generating the abridged map.
Figure 4B:
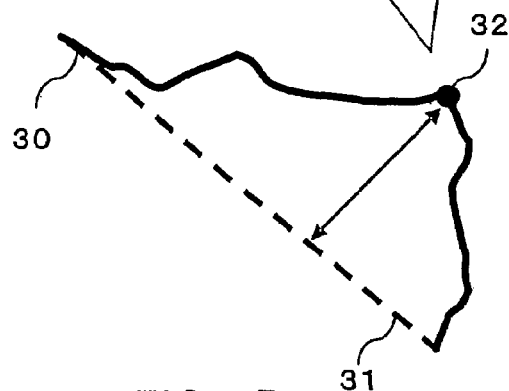

The reference symbol 30 in FIG. 4A designates, by way of example, one of the links included in a route which has been searched out. For this link 30, as shown in FIG. 4B, the point 32 upon this link 30 which is furthest from the line segment 31 which connects together both its end points is selected. It should be understood that the point 32 which is selected here corresponds to a shape interpolation point previously described and both of the end points correspond to nodes.

Figure 4D:
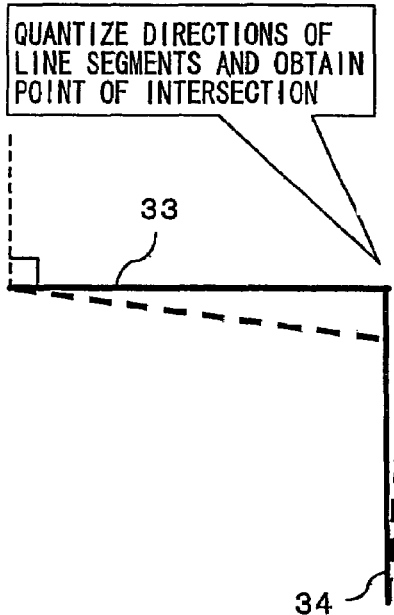
Figure 4C:
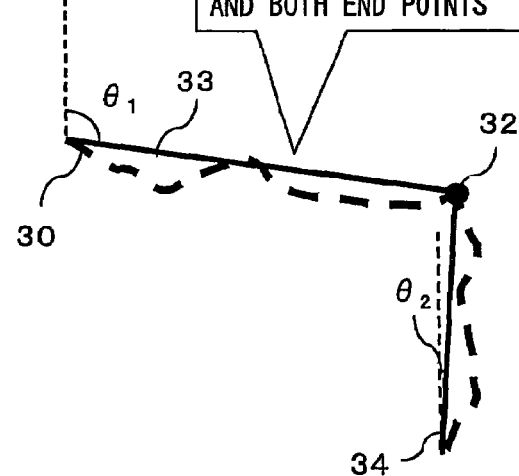

When the point 32 as described above has been obtained, next, line segments 33 and 34 are established which connect, respectively, the two end points of the link 30 with the point 32, as shown in FIG. 4C. The angles respectively formed between these line segments 33 and 34 and reference lines are defined as $\theta_1$ and $\theta_2$ respectively. It should be understood that, here, by reference lines are meant lines which extend from both the end points of the link 30 in a direction which is determined in advance (for example, the true north direction). As shown in FIG. 4C, the angle of the portion which is sandwiched between the reference line from one end point and the line segment 33 is termed $\theta_1$. Moreover, the angle of the portion which is sandwiched between the reference line from the other end point and the line segment 34 is termed $\theta_2$.

After having established the line segments 33 and 34 which connect the point 32 and the two end points of the link 30 respectively in the above described manner, next, as shown in FIG. 4D, the directions of these line segments 33 and 34 are each quantized. Here, quantization of these directions means that each of the line segments 33 and 34 is rotated around its end point as a center, so that the above described angles $\theta_1$ and $\theta_2$ become integer multiples of some unit angle which is set in advance. In other words, the values of $\theta_1$ and $\theta_2$ are revised by rotating the respective line segments 33 and 34, so that $\theta_1 = m \cdot \Delta \theta$ and $\theta_2 = n \cdot \Delta \theta$ (where n and m are integers). The values of m and n in the above described equation are set so that the $\theta_1$ and $\theta_2$ after revision which are calculated according to this equation are as close as possible to their respective original values.

When the directions of the line segments 33 and 34 are both quantized as explained above, the angles $\theta_1$ and $\theta_2$ which the line segments 33 and 34 make with the reference lines are revised so as to be multiples of the unit angle $\Delta \theta$. It should be understood that, in FIG. 4D, $\Delta \theta = 15°$. And in the figure an example is shown in which, for $\theta_1$, m is set to be equal to 6, so that the angle after revision becomes 90°, while, for $\theta_2$, n is set to be equal to 0, that the angle after revision becomes 0°.

After having quantized the directions of each of the line segments 33 and 34 in this manner, next, the point of intersection when both of the line segments 33 and 34 are prolonged is obtained. And the length of each of the line segments 33 and 34 is revised, so as to connect this point of intersection with both of the end points, as shown in FIG. 4D.

As has been explained above, the direction quantization procedure for the case of division of the link 30 into two sections is performed by obtaining the line segments 33 and 34, and by quantizing their directions as well as adjusting their lengths. By using these line segments 33 and 34 instead of the link 30, it is possible to display the shape of the link 30 in a simplified manner. Since, at this time, the shape of the link 30 is simplified in the state in which the positions of both the end points of the link 30 are fixed, thus no influence is exerted upon the positions of the adjacent links. Accordingly it is possible easily to simplify the shape of a road with maintaining the overall positional relationships of the route, by simplifying each of the link shapes of the route by using this direction quantization procedure.

Figure 5A:
FIGS. 5A, 5B, 5C, and 5D are figures for explanation of the details of a direction quantization procedure for the case of division into four sections.
Figure 5B:
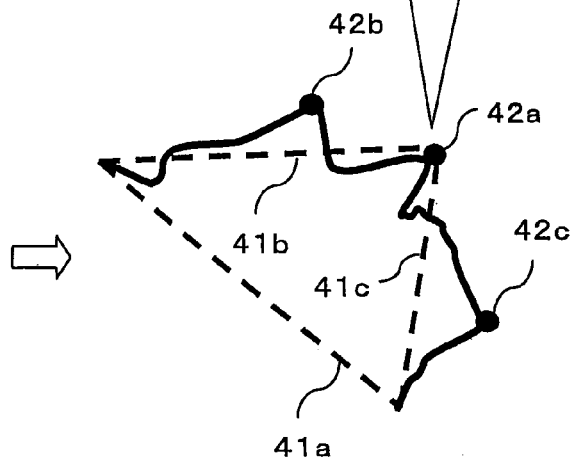

Next, the case of division into four sections will be explained. In 5 FIG. 5A, just as in FIG. 4A, the reference symbol 40 denotes, as an example, one link included in a route which has been searched out. For this link 40, first, as shown in FIG. 5B, the point 42a upon the link 40 which is furthest from the line segment 41a which joins together both the end points of this link 40 is selected. Next, the two line segments 41b and 41c which respectively connect together this point 42a and the two end points of the link 40 are established, and the points 42b and 42c upon the link 40 which are respectively positioned furthest away from these line segments 41b and 41c are selected. It should be understood that the points 42a through 42c which are selected here all correspond to the previously described nodes or shape interpolation points, just as in the case of division into two sections.

After having obtained the points 42a through 42c as described above, next, as shown in FIG. 5C, just as in the case of division into two sections, the line segments 43, 44, 45, and 46 are established which connect together the end points of the link 40 and the points 42a through 42c, in their respective order. The angles respectively formed between these line segments 43 through 46 and reference lines are expressed as $\theta_3$, $\theta_4$, $\theta_5$, and $\theta_6$ respectively. It should be understood that the reference lines at this time are not only determined at both the end points of the link 40, but rather are also determined at the point 42a which was initially selected, and which is positioned at the center of the points 42a through 42c.

After having established the line segments 43 through 46 as described above, next, as shown in FIG. 5D, the direction of each of these line segments is quantized. At this time, taking the point 42a as a preserved point, the line segments 44 and 45 are each rotated about this preserved point 42a as a center. It should be understood that, for the line segments 43 and 46, they are each rotated about the end point as a center, in the same manner as in the case of division into two sections. Here an example is shown in which $\Delta \theta = 15°$ is set in advance, and, after revision, the angles $\theta_3$, $\theta_4$, $\theta_5$, and $\theta_6$ have become, respectively, 60°, 45°, 180°, and 60°.

Figure 5D:
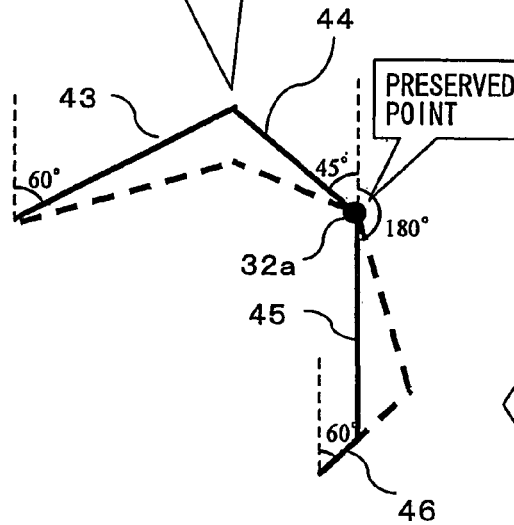
Figure 5C:
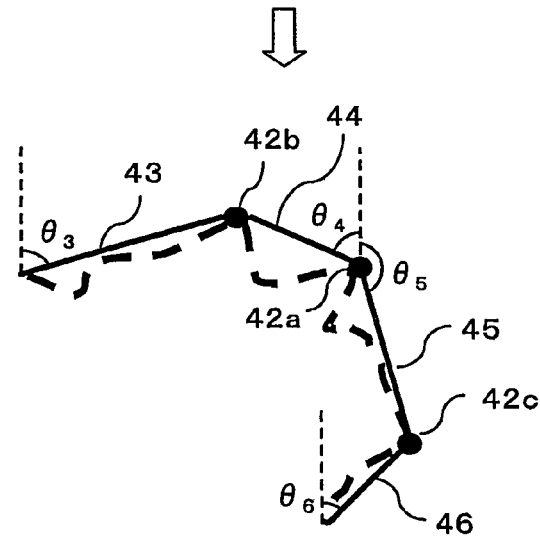

After having quantized the direction of each of the line segments 43 through 46 in this manner, next, the points of intersection are obtained when the line segments 43 and 44 have both been prolonged, and when the line segments 45 and 46 have both been prolonged. And, as shown in FIG. 5D, the lengths of the line segments 43 through 46 are each revised, so that each of the points of intersection is connected with each of the end points or the preserved point 42*a*.

As has been explained above, the direction quantization procedure for division of the link 30 into four sections is performed by obtaining the line segments 43 through 46, and by quantizing their directions as well as adjusting their lengths. By using these line segments 43 through 46 instead of the link 40, it is possible to display the shape of the link 40 in a simplified manner. At this time, the shape of the link 40 is simplified in a state in which, in addition to the positions of both the end points of the link 40, also the position of the preserved point 42*a* is also fixed. Accordingly, it is possible to simplify the shape of a road appropriately while maintaining its overall positional relationships, even for a route which is made up from links of a complicated shape.

It should be understood that although, in the above, the direction quantization procedure has been explained for the cases of division into two sections and division into four sections, it would also be possible to perform this direction quantization procedure in the same manner for division into any other number of sections. For example, in a case of division into eight sections, first, just as in the case of division into four sections, the furthest point from the line segment which connects together both end points of the link, and the furthest two points from each of the two line segments which connect together that point and the two end points, are selected. After this, further, the furthest four points from each of the four line segments which connect between these three points with the addition of both the end points are selected. By doing this, eight line segments are obtained which connect in order between the total of seven points and the two end points which have been selected, and it is possible to perform a direction quantization procedure of division into eight portions by performing quantization of the directions and adjustment of the lengths of these line segments, in the manner previously described.

How many sections should be employed for the direction quantization procedure may be set in advance, or may also be decided according to the shapes of the links. For example, when proceeding to select the furthest point from each line segment which joins between both end points or the points which have been selected up till this time in order as described above—in other words, when repeating the procedure explained in FIGS. 4B and 5B—then the procedure may be repeated until the distance from each of the line segments to the furthest point becomes less than a predetermined value, and a number of points may be selected in order corresponding to the number of times that procedure was performed. If this is done, it is possible to determine upon the number of sections for the direction quantization procedure according to the shapes of the links.

In the direction quantization procedure of division into two sections which was explained with reference to FIGS. 4A through 4D, it may happen that there is no appropriate point of intersection, even though both of the line segments 33 and 34 after their directions have been quantized are prolonged. In other words, if the line segments 33 and 34 become parallel to one another after their directions have been quantized, it may happen that no point of intersection exists, since when these lines segments are prolonged, they both combine together to become a single line segment which connects together both of the end points of the link 33. In this type of case, the shape of the link 30 may be shown as simplified by using the line segment which directly connects together both of its end points, in other words by using the line segment 31. Furthermore, in the direction quantization procedure of division into four sections which was explained with reference to FIGS. 5A through 5D, or in a direction quantization procedure of division into more sections than four, in the same manner, if no appropriate point of intersection exists when the line segments are prolonged after quantizing their directions, then it will be acceptable to perform a direction quantization procedure with a smaller number of sections.

It is possible to generate an abridged map by simplifying the road shape of each route by performing a direction quantization procedure as has been explained above upon all of the links of each route in order. It should be understood that it would also be acceptable to execute the direction quantization procedure as described above, not by units of links, but rather for each of link series which are made up by lining up a plurality of links. In this case not only shape interpolation points, but also nodes, come to be included in the points which are selected as the point 32 of FIG. 4B or as the points 42*a* through 42*c* of FIG. 5B.

Or, in the abridged map generation procedure of the step S300, it is also possible to simplify the road shape of each route, without executing the above described direction quantization procedure. In this connection, a method of simplifying the road shapes of the routes by approximating the shape of each link with a curve will now be explained with reference to FIGS. 6A, 6B, and 6C.

In FIG. 6A, by way of example, links 50, 51, and 52 are shown as one part of the links included in a route which has been searched out. For these links 50 through 52, first, as shown in FIG. 6B, the link directions quantized at both of the end points of each link are obtained. Here, in the same manner as when performing quantization of the directions of each line segment in the previously described quantization procedure, the link direction is obtained which is the integral multiple of a unit angle closest to the original angle. As a result, link directions at each end point are obtained as shown by the arrow signs in FIG. 6B.

Next, as shown in FIG. 6C, the shape of each of the links is approximated by a curve, by obtaining curves 53, 54, and 55 which connect between its end points. At this time, the shape of each of the curves 53~55 is determined so that the direction of the tangent line in the vicinity of the end points of each curve agrees with the above described quantized link direction. It should be understood that although, as a method for obtaining this type of curve, spline approximation or the like using, for example, spline functions is available, the detailed explanation thereof will herein be omitted.

It is possible to generate an abridged map in which the road shape of each route is simplified by proceeding with the execution of procedures like those explained above for all the links of each route in order, and by displaying the road shapes using the curves which have been obtained. At this time as well, in the same way as in the case of the direction quantization procedure, the shape of each link is simplified in a state in which the positions of both of the end points of that link are fixed. Accordingly, in this case as well, it is possible to simplify the road shape of each route in a simple manner, while maintaining its overall positional relationships.

Figure 7A:
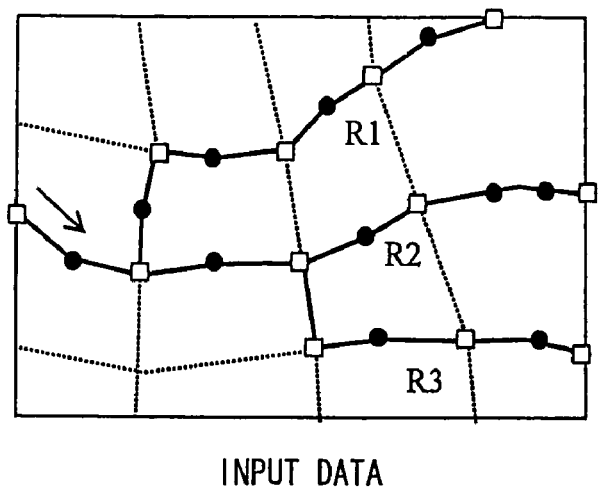
FIGS. 7A, 7B, and 7C are figures showing a situation in which route network data is changed by the direction quantization procedure.
Figure 7B:
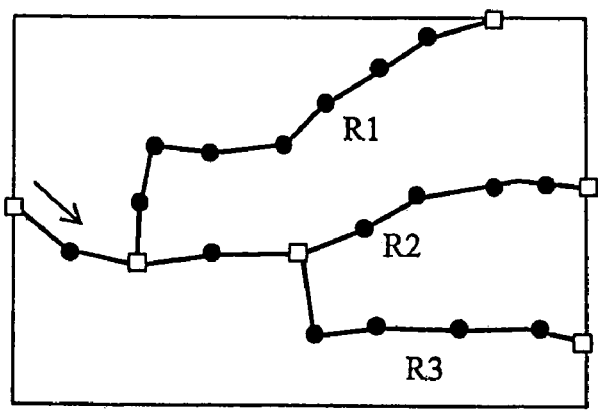
Figure 7C:
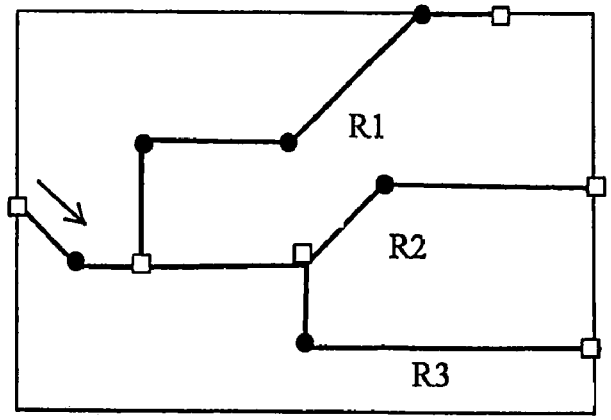

The way in which the route network data changes by the above described direction quantization procedure is shown in FIGS. 7A, 7B, and 7C. Here, the route network data is data generated based upon the map data for displaying the routes which have been found by the step S200 of FIG. 2. In the direction quantization procedure, the road shape is simplified by changing the contents of this route network data.

FIG. 7A shows the input data, in other words, the routes R1, R2, and R3 which are specified by the route network data before abridgement. The squares in the figure denote nodes, the black points denote interpolation points (shape interpolation points), and the solid lines denote links, respectively. Furthermore, the arrow sign denotes the direction of progression along a route. It should be understood that the dotted lines denote non-route links, and these are not objects of input for the direction quantization procedure. First, before abridgement, internal data like that shown in FIG. 7B is set up, based upon this type of input data. When setting up this internal data, the links of the routes are integrated and the branch points are taken as nodes. In other words, the nodes which are other than branch points (except for the start point and the end point) are replaced by interpolation points.

By executing the above described direction quantization procedure upon the internal data of FIG. 7B, output data like that shown in FIG. 7C is obtained as an abridged map. In this output data, the positions of the nodes are not changed, but rather, only the positions of the interpolation points are changed. It should be understood that the left over interpolation points, which are at portions at which the link shape does not change, are culled. By doing this, the route network data is changed by the direction quantization procedure.

FIGS. 8A, 8B, and 8C show an example of a representation format for the route network data. In the route network data, the routes are shown by node data, link data, and route data. FIG. 8A is an example of a representation format for node data, which is set individually for each node within a route. In this node data, there are included a node ID and coordinates. The node ID is allocated uniquely for each node, and this node is specified thereby. The coordinates specify the position of this node upon the map. In FIG. 8A, as an example, node data is shown in which the node ID is N1, and the coordinate values are $(X_1, Y_1)$.

FIG. 8B is an example of a representation format for link data, which is set individually for each link within a route. In this link data, there are included a link ID, a start point node ID, an end point node ID, an interpolation point number, and interpolation point information. The link ID is allocated uniquely to each link, and the link is identified thereby. The start point node ID and the end point node ID are for identifying the node IDs of the start point and the end point of this link, and it is possible to specify the coordinates of the start point and the end point by referring to those of the same note ID in the node data described above. The number of interpolation points is for indicating the total number of interpolation points included in this link, while the interpolation point information is for indicating the coordinates of the various interpolation points which are included upon this link. In FIG. 8B, as an example, link data is shown in which the link ID is L1, the start point node ID is N1, the end point node ID is N2, the number of interpolation points is p, and, for the total of p interpolation points, the coordinate values $(x_1, y_1)$ to $(x_p, y_p)$ are set as the information for these interpolation points. It should be understood that the contents of the number of interpolation points and the interpolation point information are changed as a result of the above described direction quantization procedure.

FIG. 8C is an example of a representation format for route data, which is set for each of the routes. In this route data, there are included a route ID, a number of route links, and route link information. The route ID is allocated uniquely to each route, and the route is specified thereby. The number of route links is for indicating the total number of links included in this route, while the route link information is for indicating the link IDs of the various links which are included upon this route. It is possible to specify the position and the shape of a link upon the route by referring to the one, from the previously described link data, which has the same link ID. It should be understood that, in this route link information, there is also set a direction flag for indicating the relationship of the direction of progression along this route with respect to the link IDs. By making the order of registration of the link IDs agree with the direction of progression along the route, this direction flag may also be omitted. In FIG. 8C, as an example, route data is shown in which the route ID is R1, the number of route links is n, and, for the total of n route links, the link IDs L1 through Ln are set as the route link information.

Next, the route shift procedure which is executed in the step S400 will be explained. Here, by executing the flow chart shown in FIG. 9 upon each of the routes of which the road shape has been simplified by the abridged map generation procedure of the step S300, the entirety of each route which overlaps is shifted while maintaining its original shape. In the following, the flow chart of FIG. 9 will be explained.

In a step S401, the coordinates of the respective center of gravity is obtained for each of the routes of the abridged map which has been generated in the step S300. For example, when the coordinates of the center of gravity of any route are given by $(x_g, y_g)$, these coordinate values may be calculated by the following Equation (1):

$$x_g = \sum_{i=1,n} x_i / n \qquad (1)$$

$$y_g = \sum_{i=1,n} y_i / n$$

In Equation (1), $(x_i, y_i)$ denotes the coordinate values for each point making up this route, while n indicates the number of these points. And i is an integer value from 1 to n. In other words, the average values of the coordinate values of the points which make up this route are calculated according to Equation (1), and the coordinates $(x_g, y_g)$ of the center of gravity of the route are given by these average values. In this manner, the coordinate values of the center of gravity of the route are obtained by performing weighting, according to the position of each of the points.

A situation in which the coordinates of the center of gravity of a route is obtained according to Equation (1) will now be explained using the example shown in FIG. 10. The route R1 contains a total of eight interpolation points between its start point $(x_1, y_1)$ to its end point $(x_{10}, y_{10})$. When the coordinate values of these interpolation points are taken, in order from the one closest to its start point, as $(x_2, y_2), (x_3, y_3), \ldots (x_9, y_9)$, then the coordinate values $(x_g, y_g)$ of the center of gravity G1 are calculated in the following manner, using Equation (1):

$$x_g = (x_1+x_2+x_3+x_4+x_5+x_6+x_7+x_8+x_9+x_{10})/10$$

$$y_g = (y_1+y_2+y_3+y_4+y_5+y_6+y_7+y_8+y_9+y_{10})/10$$

Or, converting the above described Equation (1), the coordinate values of the center of gravity of the route may be obtained according to Equation (2) below:

$$x_g = \sum_{i=1,n-1} l_i(x_i + x_{i+1})/2L \quad (2)$$

$$y_g = \sum_{i=1,n-1} l_i(y_i + y_{i+1})/2L$$

In Equation (2), $l_i$ denotes the length of the respective line segment which connects between the points which make up this route, while L denotes the total length of the whole route. In other words, the coordinate values of the midpoints of the line segments making up the route are each calculated according to Equation (2), and the coordinates $(x_g, y_g)$ of the center of gravity of the route are given by the total of the values, which are obtained by multiplying the coordinate values of their mid-points by the proportions of the line segments length to the whole route length. In this manner, the coordinate values of the center of gravity of the route are obtained by performing weighting, according to the length of each of the line segments.

Figure 10:
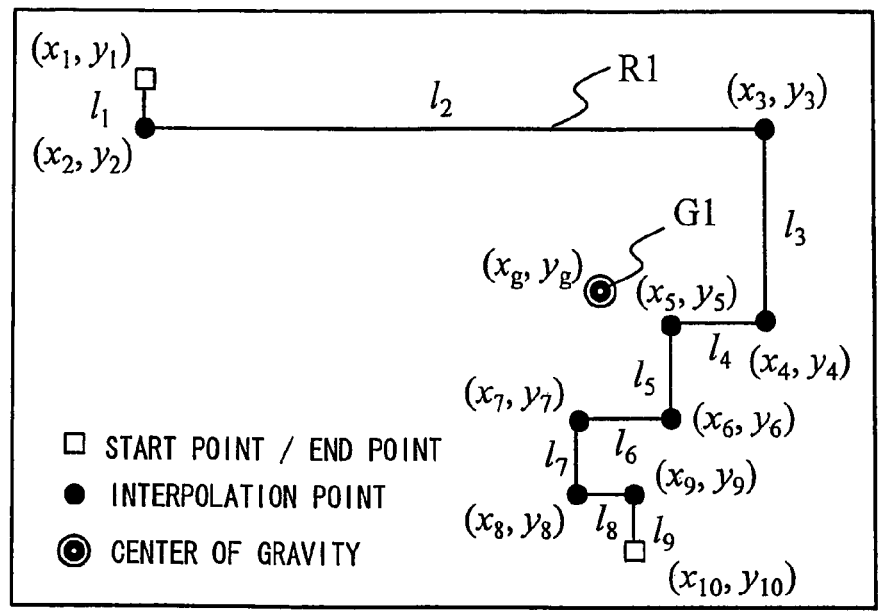
FIG. 10 is a figure for explanation of a situation when obtaining the coordinate of center of gravity of a route.

In the example of FIG. 10, if the lengths of the line segments which connect between the various points of the route R1 (its start point, its end point, and its interpolation points) are respectively termed l1, l2, . . . l9 in order from the one closest to the start point, then at this time the coordinate values $(x_g, y_g)$ of the center of gravity G1 are calculated in the following manner, using Equation (2). It should be understood that $$L = l_1 + l_2 + l_3 + l_4 + l_5 + l_6 + l_7 + l_8 + l_9 + l_{10}.$$

$$x_g = \{l_1(x_1 + x_2) + l_2(x_2 + x_3) + \ldots + l_9(x_9 + x_{10})\}/2L$$

$$y_g = \{l_1(y_1 + y_2) + l_2(y_2 + y_3) + \ldots + l_9(y_9 + y_{10})\}/2L$$

In the same manner as explained above, the coordinate values of the centers of gravity for all of the routes are calculated in the step S401.

In a next step S402, the X coordinate values and the Y coordinate values of the centers of gravity of the various routes which were obtained in the step S401 are arranged in the order of their size. And, in a step S403, shift amounts for the X coordinate are set for these routes, according to their order of size as they were arranged in the step S402, and in order from the route for which the X coordinate value of its center of gravity is the least. For the route for which the X coordinate value of the center of gravity is the least, the shift amount of the X coordinate is set to zero; for the route for which it is next least, the shift amount of the X coordinate is set to a predetermined value dx; for the route for which it is next least, the shift amount of the X coordinate is set to 2dx. Here, the size of dx is determined in advance; for example, if the display line width for the route is taken as w, then dx=w/2 may be set. By doing the same as above, a shift amount of the X coordinate greater by dx each time is set for all of the routes, in order from the route for which the X coordinate value of its center of gravity is the least.

In a step S404, the same procedure as in the step S403 is performed for a shift amount for the Y coordinates. In other words, according to the order of size by which the routes were arranged in the step S402, in order from that route for which the Y coordinate value of the center of gravity is the least, the shift amounts for the Y coordinates for those routes are set to 0, dy, 2dy . . . in order, i.e. to values increased by a predetermined value dy each time. It should be understood that the size of dy is determined upon in advance; in the same manner as for dx as described above, if the display line width for the route is taken as w, then dy=w/2 may be set.

As has been explained above, a shift width for each of the routes which are overlapping is individually set, based upon the coordinates of the center of gravity of the route.

In a step S405, the position of each of the points which makes up each of the routes is shifted according to the shift amounts of the X coordinate and the Y coordinate which have been set in the steps S403 and S404. By doing this, the drawing position of the entirety of each route is shifted, while maintaining its original shape.

Figure 11:
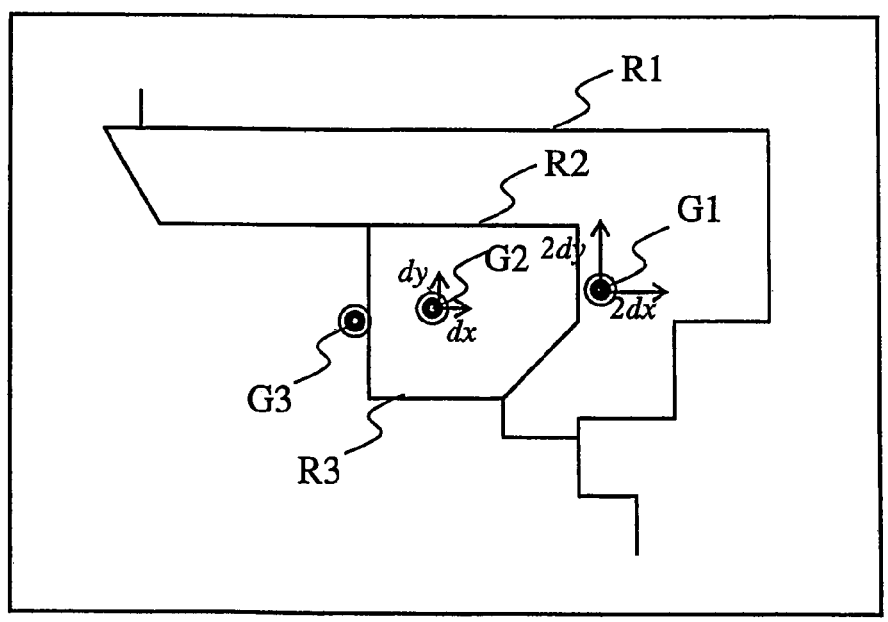
FIG. 11 is a figure showing a situation when shifting the drawing position of certain routes according to a set shift amount.

FIG. 11 is a figure showing a situation in which the drawing position for each route is shifted upon the screen according to the shift amounts which has been set. For example, as shown in the example of FIG. 11, the X coordinate value and the Y coordinate value of the center of gravity G2 of the route R2 are both greater than those of the center of gravity G3 of the route R3, and furthermore the X coordinate value and the Y coordinate value of the center of gravity G1 of the route R1 are both greater than those of those centers of gravity. In this case, for the route R3 for which the X coordinate value and the Y coordinate value of the center of gravity are both the smallest, the shift amounts for the X coordinates and for the Y coordinates are both set to zero in the steps S403 and S404. Accordingly, the drawing position for the route R3 is not shifted in the step S405.

For the route R2 for which the X coordinate value and the Y coordinate value of the center of gravity are the next smallest after the route R3, in the steps S403 and S404, the shift amount for the X coordinates is set to dx and the shift amount for the Y coordinates is set to dy. Furthermore, for the route R1 for which the X coordinate value and the Y coordinate value of the center of gravity are the largest, in the steps S403 and S404, the shift amount for the X coordinates is set to 2dx and the shift amount for the Y coordinates is set to 2dy. And, in the step S405, the drawing positions for the routes R1 and R2 are respectively shifted in the X direction, in other words in the horizontal direction upon the screen, and in the Y direction, in other words in the vertical direction upon the screen, by just these shift amounts. By setting the shift amount for each of the routes according to its center of gravity position in this manner, it is possible to arrange for routes which are originally separated not to shift towards one another.

When the step S405 has been executed by performing the above explained procedure, then the procedural flow of FIG. 9 terminates. Thereby, the route shift procedure of the step S400 of FIG. 2 is concluded.

Figure 12A:
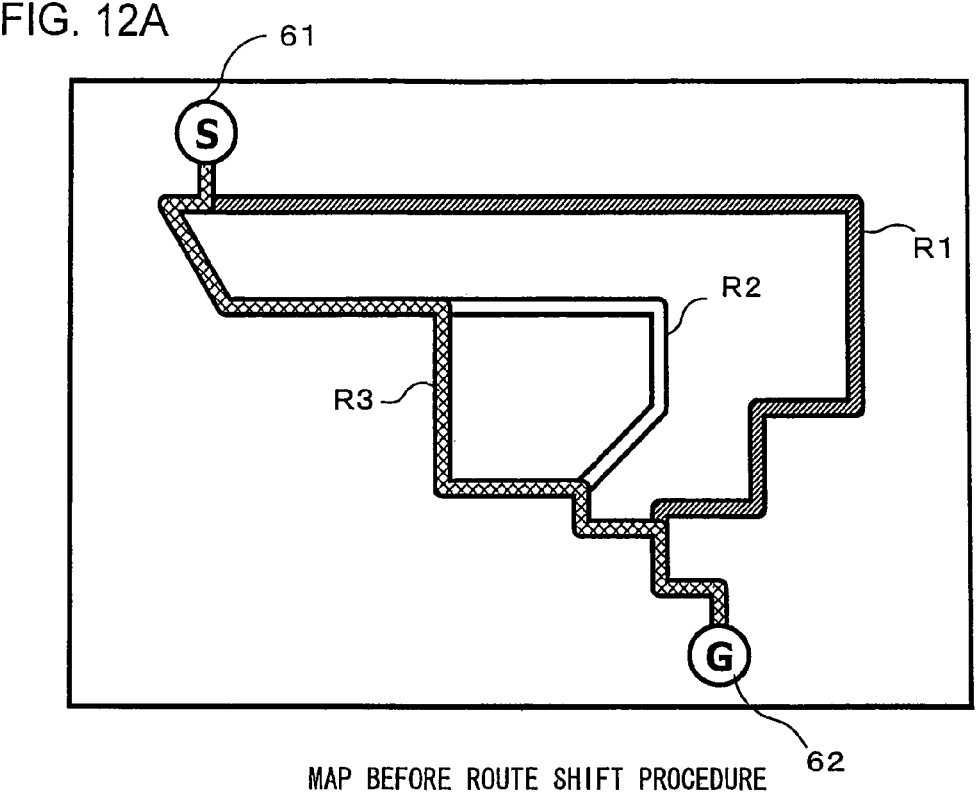
FIG. 12A is a figure showing the drawing position of certain routes before a route shift procedure, in the first embodiment.
Figure 12B:
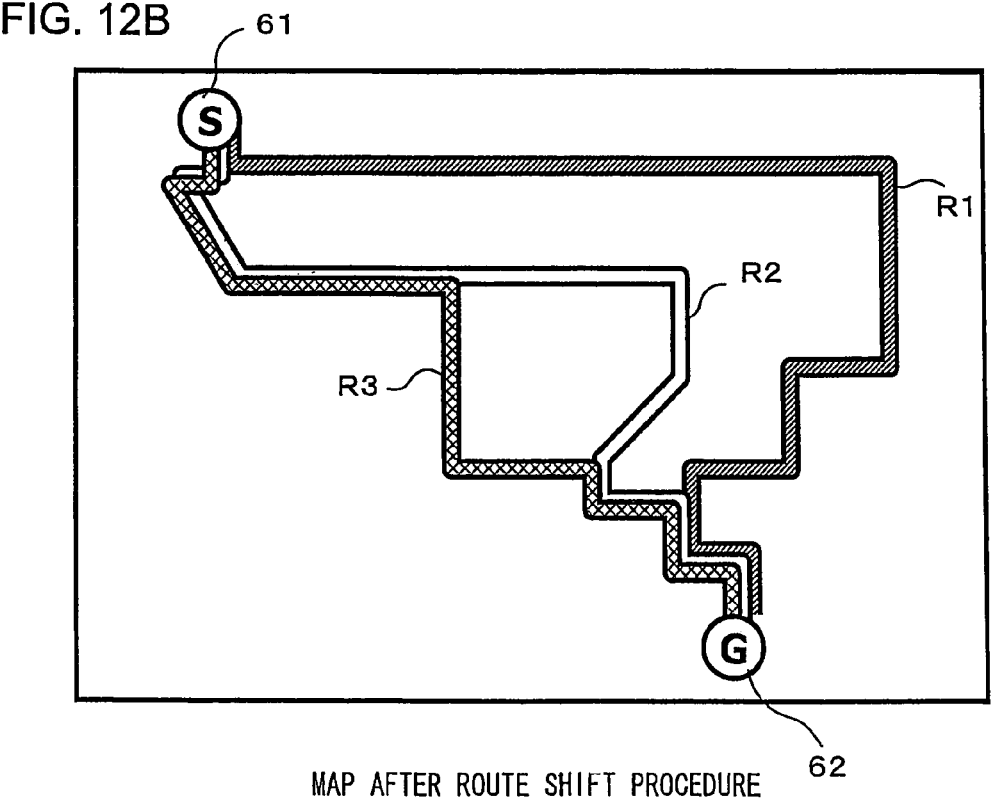
FIG. 12B is a figure showing the drawing position of certain routes after the route shift procedure, in the first embodiment.

FIGS. 12A and 12B are figures showing the state of change of the drawing positions of each of the routes before and after the route shift procedure. FIG. 12A is a figure showing the routes before the route shift procedure, in other words after the abridged map generation procedure of the step S300, while FIG. 12B is a figure showing the routes after the route shift procedure. In FIG. 12B, the respective drawing positions of the routes R1 and R2 are shifted with respect to FIG. 12A according to shift amounts which have been set by the route shift procedure described above. With respect to the display line width w of the routes, dx=dy=w/2 is determined upon; and the route R2 is shifted in both the X direction and in the Y direction by dx, in other words by just half of the display line width for the routes, while the route R1 is shifted in both the X direction and in the Y direction by 2dx, in other words by just the display line width for the routes. By doing this, each route is shifted by the predetermined width unit which has been determined in advance. It should be understood that, since the shift amount for the route R3 is set to zero, its drawing position is not shifted.

According to the first embodiment explained above, the following operational benefits are obtained.

(1) If two or more among the plurality of routes which have been searched out are overlapping upon and passing through the same road, then it is arranged to display these overlapping portions as shifted. Since this is done, it is possible, when displaying the plurality of routes simultaneously upon the map, to display the overlapping portions so that they can easily be seen. In particular, for a plurality of routes of which the road shapes upon an abridged map have been simplified and which are mutually overlapping, it is possible to perform display so that, in these overlapped portions, it is possible to distinguish each of the routes.

(2) When displaying the overlapped portions as shifted, it is arranged to shift the entirety of each route while maintaining its original shape unchanged. Since this is done, it is possible to perform display while shifting the overlapped portions, by a simple procedure.

(3) It is arranged to set a respective shift width for each of the routes which are overlapping, based upon the coordinates of the center of gravity of each route. Since this is done, it is possible to set the shift widths by a simple procedure, when performing display while shifting the overlapped portions.

(4) Since it is arranged to shift each of the routes by the predetermined width unit which is determined in advance, accordingly, even if three or more routes are overlapping, it is possible to display each of the routes in such a manner that it can easily be seen.

The Second Embodiment

A second embodiment of the present invention will now be explained. With the navigation apparatus according to this embodiment, the route shift procedure is performed, and the drawing positions of the various routes are shifted, by a method which is different from the one which was explained for the above described first embodiment. By doing this, in the abridged map which has been generated, the portions in which two or more routes overlap one another are drawn in such a display format, that it is possible to distinguish each of the routes. It should be understood that the structure of the navigation apparatus in this embodiment is the same as that of the first embodiment shown in FIG. 1. Furthermore, the flow chart of the processing which is executed when setting a destination for the navigation apparatus of this embodiment is the same as that of the first embodiment shown in FIG. 2.

Figure 13A:
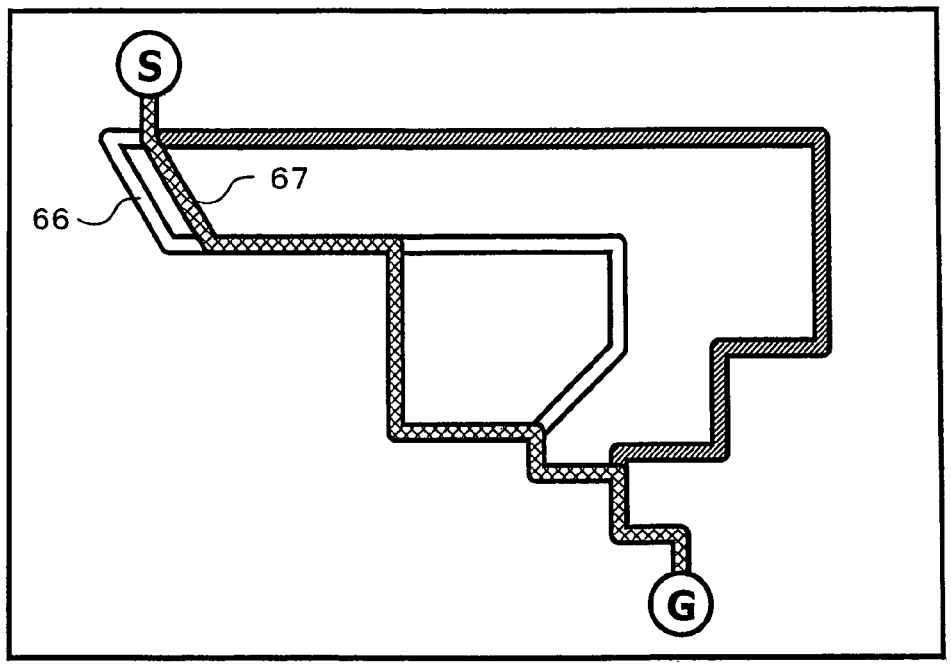
FIGS. 13A and 13B are figures for explanation of a problematical point when using the method of the route shift procedure of the first embodiment.
Figure 13B:
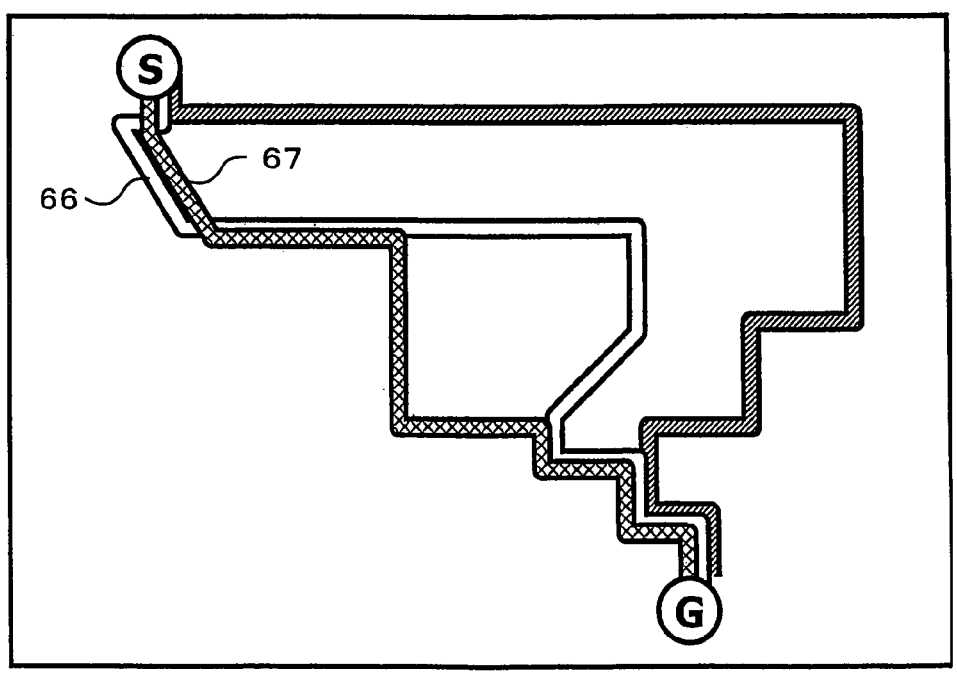

FIGS. 13A and 13B are figures for explanation of a problematical point when using the route shift procedure of the first embodiment. For example if it is supposed that each route, before the route shift procedure, is in a state as shown in FIG. 13A, then, in the route shift procedure method of the above described first embodiment, the drawing position of each route is shifted upon the screen, as shown in FIG. 13B. At this time, although the portions of different routes shown by the reference symbol 66 and shown by the reference symbol 67 are mutually separated from one another in FIG. 13A, they are close together in FIG. 13B. Accordingly, for these portions, although they pass through different roads which are mutually separated from one another in actual, it appears that they are portions which originally overlapped one another and which have been shifted by the route shift procedure. In the route shift procedure method of the first embodiment, there is a possibility that this type of problem may arise.

In order to avoid the type of problem explained above, in the route shift procedure of this embodiment, in the step S400 of FIG. 2, instead of the flow chart of FIG. 9 which has already been explained for the first embodiment, the flow chart shown in FIG. 14 is executed. By doing this, for each of the routes of which the road shape has been simplified by the abridged map generation procedure of the step S300, it is arranged only to shift the portion of each route which is overlapping, without shifting the portions other than these overlapping portions. In the following, the flow chart of FIG. 14 will be explained.

In a step S410, initialization of the route network data is performed. The route network data which is initialized here is the data after the road shapes have been simplified by the abridged map generation procedure. With this route network data after abridgement, in the step S410, the interpolation points upon the routes are all treated as nodes. And a link overlap amount is established for each of the links which connects between these nodes, showing how many of the routes are overlapped. The initialization of the route network data is performed in this manner.

Figure 18A:
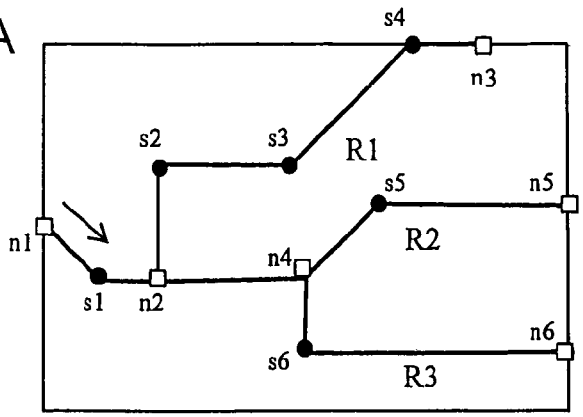
FIGS. 18A, 18B, and 18C are figures for explanation of a state of initialization of route network data.

A state of initialization of the route network data in the step S410 will now be explained using the example shown in FIGS. 18A, 18B, and 18C. In FIG. 18A, there are shown routes R1, R2, and R3 which are indicated by input data, in other words by route network data which was generated by the abridged map generation procedure of the step S300. It will be supposed that, in this input data, nodes n1~n6 and interpolation points s1~s6 are disposed at respective positions of the various routes shown in the figure. The node n1 corresponds to the departure point (the current position), and the routes continue from here via the node n2 to the node n3, n5, or n6. The link which connects between the nodes n1 and n2 is used in common upon the routes R1, R2, and R3. Furthermore, the link which connects between the nodes n2 and n4 is used in common upon the routes R2 and R3.

Figure 18B:
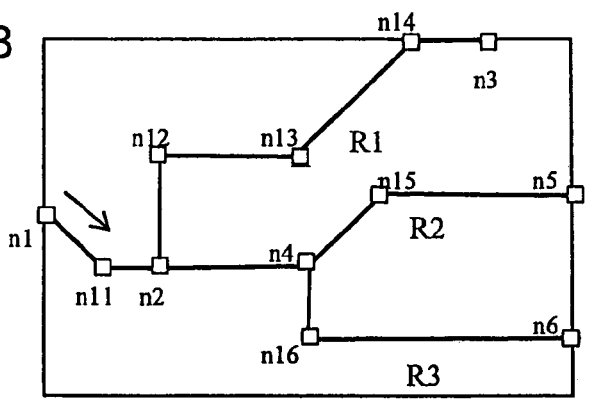
Figure 18C:
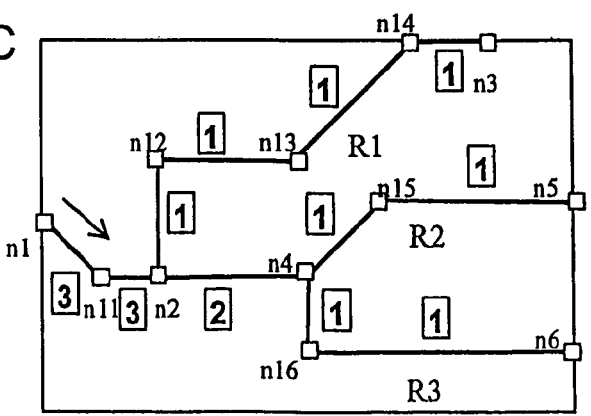

FIG. 18B shows the situation with the interpolation points in the input data of FIG. 18A replaced by nodes. In doing this, the interpolation points s1~s6 have been replaced by the nodes n11~n16 respectively. And FIG. 18C shows the situation when the link overlap amount has been established for each of the links which connects mutually between the nodes of FIG. 18B, in other words the original nodes n1~n6 and the nodes n11~n16 which were added by replacement from the interpolation points. For example, since the routes R1, R2, and R3 overlap upon the link between the nodes n1 and n11, its link overlap amount is set to 3. The initialization of the route network data is performed by establishing the link overlap amount for each of the links in this manner.

After the initialization of the route network data has been performed in the above described manner, a representation format is used which is different from that before initialization. FIGS. 19A, 19B, and 19C show an example of a representation format for the route network data after it has been initialized. The node data of FIG. 19A and the route data of FIG. 19C are the same as those shown in FIGS. 8A and 8C, in the representation format before initialization.

In the link data of FIG. 19B, in addition to the link ID, the start point ID, and the end point node ID, which are the same as before initialization, there are included an initial value of the link ID and the overlap amount. The initial value of the link ID indicates the link ID just after it was initialized. As will be explained hereinafter, this is set in order, if a copy link has been newly generated during the link shift procedure of the step S440, to make it possible to distinguish the link which was its origin. It should be understood that, for a copy link which has been newly generated, along with setting a new link ID, the link ID of the link which was its origin is set as an initial value. The overlap amount indicates the link overlap amount, and has been previously discussed.

It should be understood that, as has been explained with reference to FIGS. 18A through 18C, in the route network data after initialization, the interpolation points are all replaced by nodes. Due to this, the number of interpolation points and the interpolation point information is not included in the link data of FIG. 19B, which is different from the representation format before initialization shown in FIG. 8B. Instead, route link reference information is included. This gives the route ID of the route in which this link is included, and a route link number showing where this link is from the start point upon the route. If the overlap amount is m, then m groups of route ID and route link number are included in the route link reference information.

In a step S420 of FIG. 14, for the route network data which was initialized in the step S410, a link is selected in order from the head link, in other words in order from the link on the side closest to the departure point. In the example of FIG. 18C, it is selected in order from the links between the node n1 and the node n11. In a step S430, for the link which was selected in the step S420, a decision is made as to whether or not the value of its link overlap amount which has been established is greater than 1. If it is greater than 1, then the flow of control proceeds to a step S440. If the value of the link overlap amount is not greater than 1, in other words, if it is 1, then the flow of control proceeds to a step S460.

Figure 15:
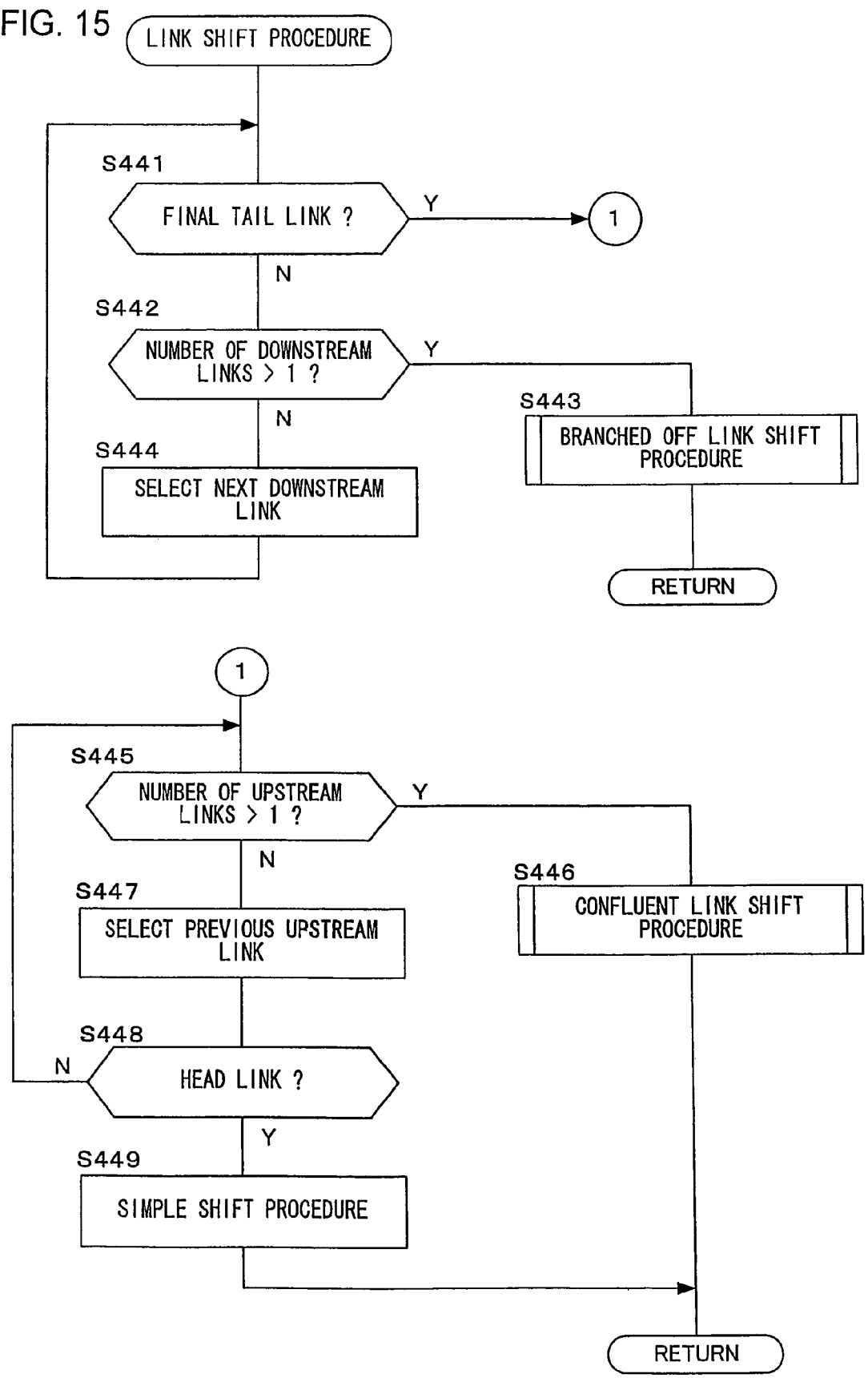
FIG. 15 is a flow chart of a link shift procedure which is executed during the route shift procedure.

In the step S440, a link shift procedure shown in the flow chart of FIG. 15 is executed upon the links for which it has been decided, in the step S430, that the link amount is greater than 1. By this link shift procedure, for a plurality of routes which are mutually overlapped on the link, the drawing positions of these overlapped portions are each shifted upon the screen. It should be understood that the contents of this link shift procedure will be explained in detail hereinafter.

In the step S450, re-structuring of the route network data is performed to reflect the results which have been obtained by performing the link shift procedure in the step S440. In other words, the overlapped portions of which the drawing positions have been shifted are shown as different individual links. After having executed the step S450, the flow of control returns to the step S420, links are again selected in the route network data after re-structuring in order from the head link, and the procedure explained above is repeated.

On the other hand, if in the step S430 it is decided that the value of the link overlap amount is not greater than 1 and the flow of control proceeds to the step S460, then, in this step S460, a decision is made as to whether or not there is a next link after the link that is currently selected. If there is a next link, then the flow of control returns to the step S420, and this link is selected and a procedure like the one described above is repeated. If there is no next link—in other words, if all of the links have been selected in the step S420—then the flow chart of FIG. 14 terminates. By doing as explained above, the route shift procedure of this embodiment is executed, and the drawing position of each route upon the screen is shifted.

Next, the link shift procedure which is executed in the step S440 will be explained with the flow chart shown in FIG. 15. In a step S441, a decision is made as to whether or not the link which is currently selected is at the final tail, in other words, whether or not it is a link which arrives at the destination. If the link is at the final tail, then the flow of control proceeds to a step S445, while, if it is not, then the flow of control proceeds to a step S442. In the following, the case in which control has proceeded to the step S442 will be explained first.

In the step S442 a decision is made as to whether or not the number of downstream links with respect to the link which is selected is greater than 1. Here by downstream link is meant, when proceeding along the route towards the destination from the departure point, the number of links which are connected ahead from the subject link. In other words, if the number of downstream links is 1, then the two links are connected one-to-one; while, if the number of downstream links is 2 or more, then a plurality of links are branched off from this single link. If the number of downstream links is greater than 1, then the flow of control proceeds to a step S443, while if it is not greater than 1, in other words if the number of downstream links is 1, then the flow of control proceeds to a step S444.

In the step S443, a branched off link shift procedure shown in FIG. 16 is executed upon the link which is selected. The details thereof will be explained hereinafter. After this step S443 has been performed, the flow chart of FIG. 15 terminates. By doing this, the link shift procedure in the step S440 of FIG. 14 is executed.

On the other hand, in the step S444, the next downstream link is selected. At this time, since it has been decided in the step S442 directly before that the number of downstream links is 1, it is this single downstream link which is selected. When in this step S444 the next downstream link has been selected, the flow of control returns to the step S441, and a procedure like the one previously described is repeated upon this downstream link.

Next, the case in which the flow of control proceeds from the step S442 to the step S445 will be explained. In this step S445, a decision is made as to whether or not the number of upstream links from the link which is selected is greater than 1. Here by upstream link is meant, when proceeding along the route towards the destination from the departure point, the number of links which are connected before the subject link. In other words, if the number of upstream links is 1, then the two links are connected one-to-one; while, if the number of upstream links is 2 or more, then this single link is the confluence of a plurality of links. If the number of upstream links is greater than 1, then the flow of control proceeds to a step S446, while if it is not greater than 1, in other words if the number of upstream links is 1, then the flow of control proceeds to a step S447.

Figure 17:
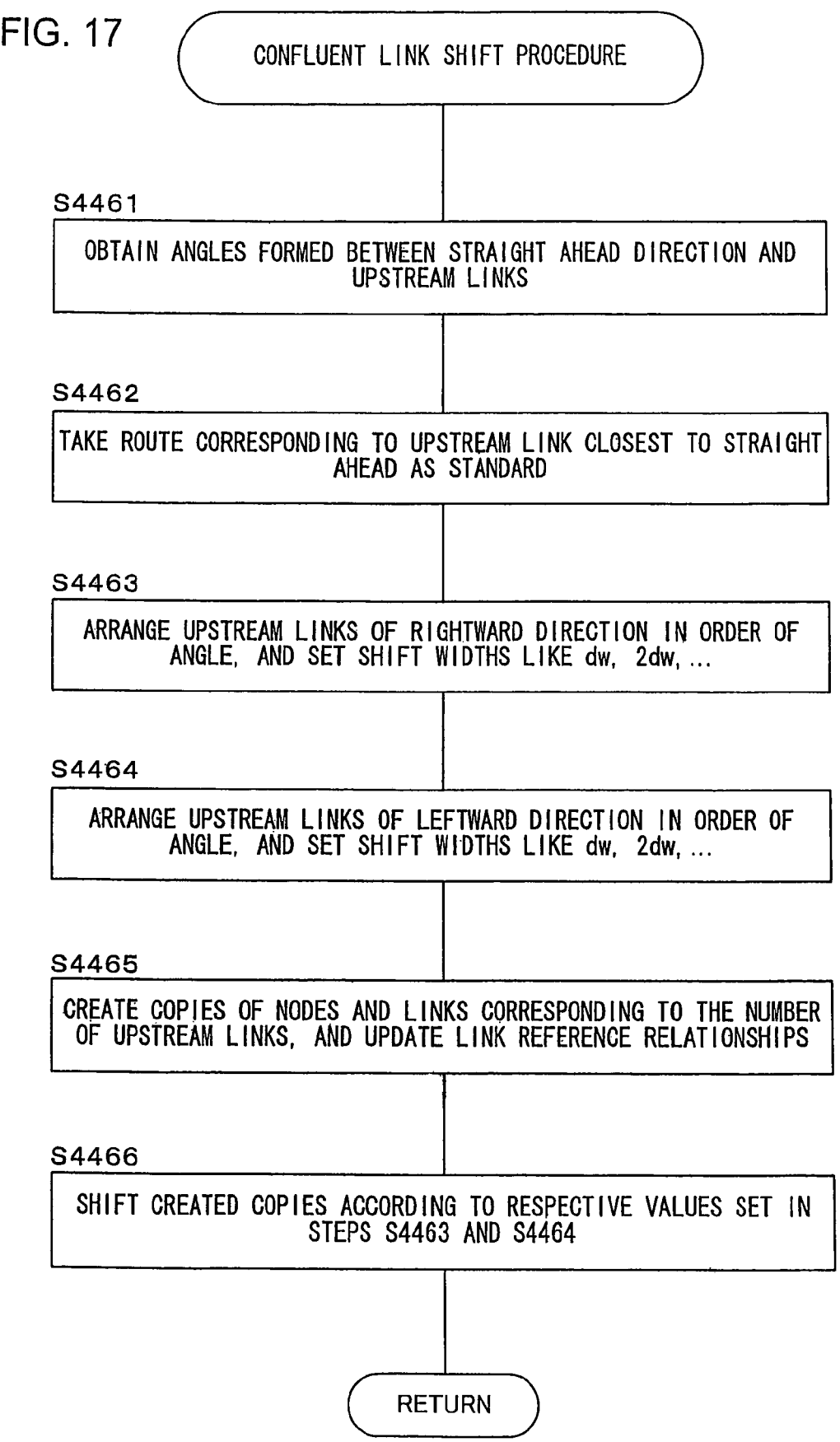
FIG. 17 is a flow chart of a confluent link shift procedure which is executed during the link shift procedure.

In the step S446, a confluent link shift procedure shown in FIG. 17 is executed upon the link which is selected. The details thereof will be explained hereinafter. After this step S446 has been performed, the flow chart of FIG. 15 terminates. By doing this, the link shift procedure in the step S440 of FIG. 14 is executed.

On the other hand, in the step S447, the previous upstream link is selected. At this time, since it is decided in the previous step S445 that the number of upstream links is 1, it is this single upstream link which is selected. When this previous upstream link has been selected in the step S447, in the next step S448 a decision is taken as to whether or not this upstream link is the head link. If it is the head link, then the flow of control proceeds to a step S449, while if it is not then the flow of control returns to the step S445, and a procedure like the one described previously is repeated upon this link.

If the flow of control has proceeded to the step S449, then it is the case that, for all of the links from the head to the final tail, the number of upstream links and the number of downstream links are both 1. To put it in another manner, the plurality of routes are perfectly overlapping from the departure point to the destination. In this type of case, a simple shift procedure is executed in the step S449. Here, for this simple shift procedure, the method for a route shift procedure like that explained in the first embodiment may be applied. It should be understood that this step S449 may also be omitted. In this case, the plurality of routes which are perfectly overlapping from the departure point to the destination come to be displayed overlapping just as they are upon the abridged map.

Next, the branched off link shift procedure of the step S443 will be explained using the flow chart of FIG. 16. In a step S4431, the angles respectively formed between the straight ahead direction of the link which has been selected at this time and downstream links are obtained. In a step S4432, the route which is closest to the straight ahead direction of the link which is selected, in other words, the route which corresponds to that downstream link for which the angle calculated in the step S4431 is the smallest, is set as a standard route.

In a step S4433, the downstream links which are connected in the rightward direction with respect to the direction of progression of the link which is selected are arranged in the order of smallness of the angles calculated in the step S4431. And, in a subsequent step S4435, the shift widths for the copy links created respectively corresponding to each downstream link are set in steps of dw, like dw, 2dw, . . . It should be understood that the size of dw is determined in advance; if, for example, the display line width of the routes is w, then dw=w/2 may be determined upon.

In a step S4434, the same procedure as in the step S4433 is performed for the downstream links which are connected in the leftward direction with respect to the direction of progression of the link which is selected. In other words, these downstream links are arranged in the order of smallness of the angles calculated in the step S4431, and, in a subsequent step S4435, the shift widths for the copy links created respectively corresponding to each downstream link are set in steps of dw, like dw, 2dw, . . . By doing this, i.e. by the procedures of the steps S4433 and S4434, shift widths are set respectively for each of these routes which are overlapping, based upon the outward angles of the routes from the overlapped portion.

In the step S4435, for the link which is selected, according to the number of the downstream links, copies are created of the nodes and links corresponding respectively to each of the downstream links. At this time, just one fewer copy is created than the number of the downstream links. By doing this, copy links which are the same as the selected link are created, just corresponding to the number of routes which overlap. And these copy links which have been created are put into correspondence with the downstream links, one to each respectively. The information about this correspondence is reflected in the route network data, and the reference relationships between the links are updated.

Figure 20A:
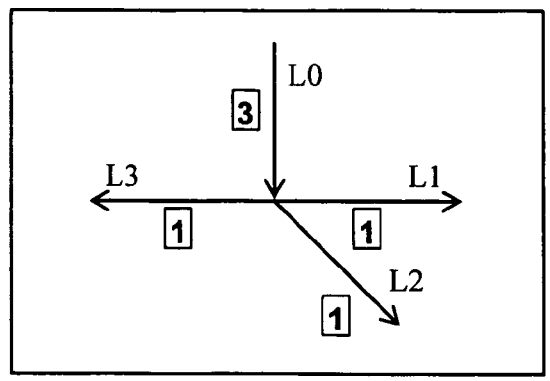
FIGS. 20A, 20B, and 20C are figures showing a concrete example of the branched off link shift procedure.
Figure 20B:
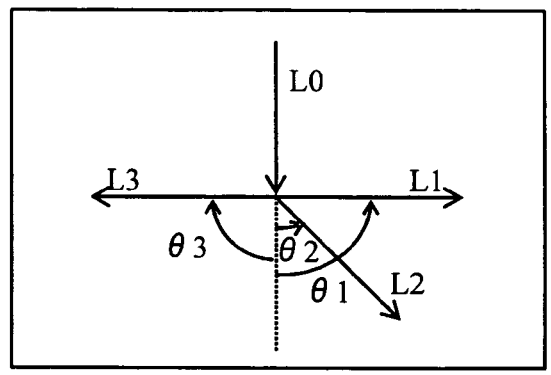
Figure 20C:
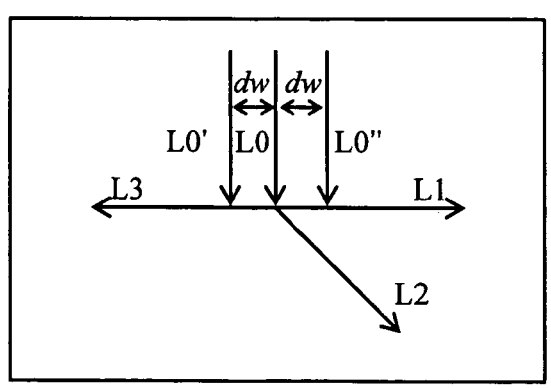

In a step S4436, the drawing positions of the respective copy links which have been put into correspondence with the downstream links in the step S4435 are shifted upon the screen, according to the shift widths which were set in the steps S4433 and S4434. When this step S4436 has been executed, the flow chart of FIG. 16 terminates. By this, the branched off link shift procedure of the step S443 of FIG. 15 is executed. FIGS. 20A, 20B, and 20C show a concrete example of the branched off link shift procedure explained above. Suppose that, for example, links L0, L1, L2, and L3 are present, as shown in FIG. 20A. 3 is set to the link overlap amount in the link L0, while 1 is set in the link overlap amount in the links L1~L3. The arrow sign for each of the links indicates its direction of progression, so that the links L1~L3 correspond to downstream links of the link L0. At this time, the link L0 is supposed to have been selected as an object of the branched off link shift procedure.

First, in the step S4431 of FIG. 16, angle calculation for the downstream links L1 through L3 of the link L0 is performed. At this time, taking the progression direction of the link L0 as shown by the arrow as a standard angular position, the angles θ1, θ2, and θ3 from this standard direction are obtained, as shown in FIG. 20B. When this is done, since θ2 is the smallest, in a step S4432, the route which corresponds to the link L2 is taken as a standard one.

Next, in a step S4433, the shift width of dw is set for the copy link which is in correspondence with the link L3, in other words, for the subsequently described copy link L0'. In a subsequent step S4434, the shift width of dw is set for the copy link which is in correspondence with the link L1, in other words, for the subsequently described copy link L0". And, in a step S4435, copy links L0' and L0" of the link L0 are created. And the copy link L0' is put into correspondence with the link L3, while the copy link L0" is put into correspondence with the link L1.

Next, in a step S4436, the copy links L0' and L0" are respectively shifted left and right by just the shift width dw which has been set, as shown in FIG. 20C. And, in their connection positions after being shifted, the copy link L0' is connected with the link L3, while the copy link L0" is connected with the link L1. It should be understood that the link L0 is connected with the link L2. By doing this, the branched off link shift procedure is executed.

The confluent link shift procedure of the step S446 of FIG. 15 will now be explained. The flow chart shown in FIG. 17 is one which shows the contents of the procedure which is executed in this confluent link shift procedure. In a confluent link shift procedure such as shown in this flow chart, the same contents as those of the branched off link shift procedure of FIG. 16 are executed upon the upstream links. Due to this, the concrete explanation of the flow chart of FIG. 17 will be curtailed. By the procedures of the steps S4463 and S4464 of this flow chart, just as in the case of the steps S4433 and S4434 of FIG. 16, shift widths are set individually for each of the routes which are overlapping, based upon the inward angles towards the overlapped portion of each of these routes.

Figure 21A:
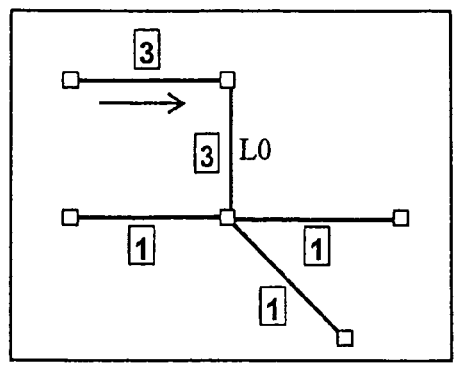
FIGS. 21A, 21B, 21C, 21D, and 21E are figures showing concrete examples when the route shift procedure has been performed upon various routes.

A concrete example of when a route shift procedure like that explained above has been executed is shown in FIG. 21A, FIG. 21B, FIG. 21C, FIG. 21D, and FIG. 21E. When the links which makes up each route are supposed to be in a state like that of FIG. 21A, then the link L0, which is before the initial branch point, is initially selected by the above described procedure. The branched off link shift procedure of FIG. 16 is executed upon this link L0, and it is divided into three, as shown in FIG. 21B.

Figure 21B:
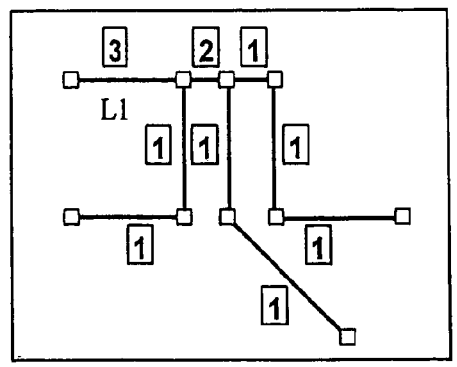
Figure 21C:
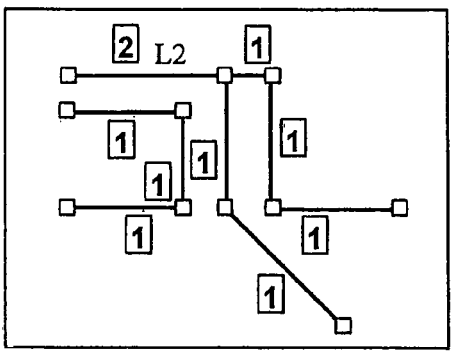
Figure 21D:
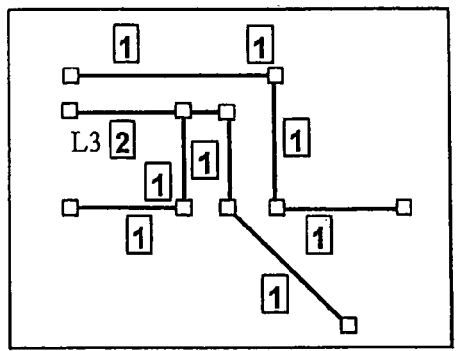
Figure 21E:
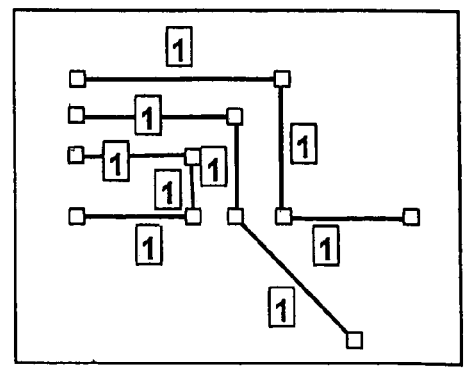

Next, in the state of FIG. 21B, the link L1, which is before the initial branch point, is selected. By executing a divided link shift procedure upon this link L1, the link L1 is divided and is changed as shown in FIG. 21C. In the same manner, in FIG. 21C, the link L2 is selected, and, by this being divided by the divided link shift procedure, it is changed as in FIG. 21D. Furthermore, in FIG. 21D, the link L3 is selected, and, by this being divided by a divided link shift procedure, it is changed as in FIG. 21E. By doing this, all of the overlapped portions are divided, and the overlapped routes are displayed with their respective positions shifted from one another.

Figure 22A:
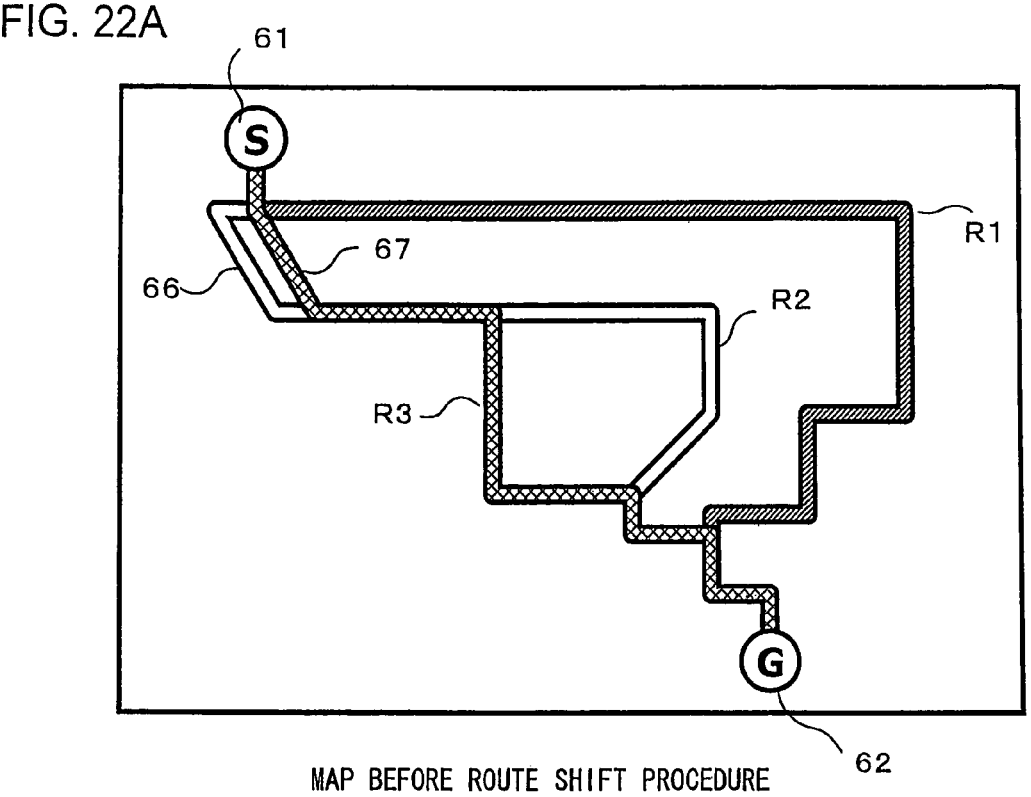
FIG. 22A is a figure showing the drawing positions of each routes before the route shift procedure of the second embodiment.
Figure 22B:
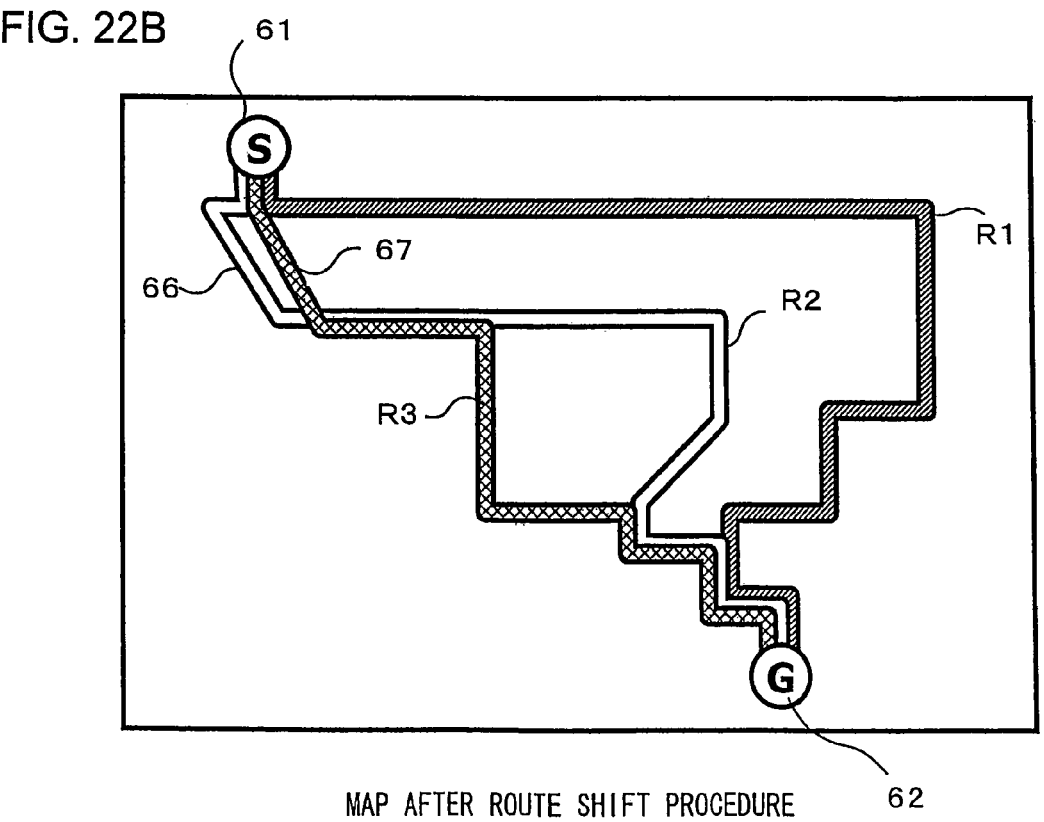
FIG. 22B is a figure showing the drawing positions of each routes after the route shift procedure of the second embodiment.

FIGS. 22A and 22B are figures showing the state of change of the drawing positions of the routes, before and after the route shift procedure. FIG. 22A is one which shows the routes before the route shift procedure, in other words after the abridged map generation procedure of the step S300, while FIG. 22B is one showing the routes after the route shift procedure. Since in FIG. 22B the drawing positions of the overlapped portions of the routes are each shifted by the respective link unit with respect to FIG. 22A, nothing happens like the portion shown by the reference symbol 66 and the portion shown by the reference symbol 67, which are at mutually separated positions as in FIG. 11, approaching one another.

According to the second embodiment explained above, the following operational benefits are obtained.

(1) When displaying the overlapped portions as shifted, it is arranged to shift only the portion of each route which is overlapped, while not shifting the portions thereof other than the overlapped portion. Since this is done, it is possible to avoid routes which are mutually separated being erroneously displayed close together and becoming impossible to distinguish from overlapped portions, so that it is possible to display the overlapped portions as being displaced in a more appropriate manner.

(2) It is arranged to set the shift width individually for each of the overlapped routes based upon the outward angle from its overlapped portion or the inward angle towards its overlapped portion. Since this is done, it is possible to set an appropriate shift width which is matched to the shape of the route.

It should be understood that although, in the above described embodiments, an example was explained in which the plurality of routes which were found were displayed upon the abridged map, the present invention may also be applied to a navigation apparatus which displays the plurality of routes which have been found upon a normal map which is not abridged.

Although, in the above described embodiments, the explanation is made in terms of an example in which the map data is read out from a storage media such as a DVD-ROM or the like by the navigation apparatus, and an abridged map is generated, the present invention is not limited by these details. For example, it would also be possible to apply the present invention to a communicating navigation apparatus or the like which downloads the map data from an information distribution center, using wireless communication with a portable telephone or the like. In this case, the procedure of generating an abridged map as explained above may be performed by the information distribution center, with the result thereof being outputted from the information distribution center as a signal which is distributed to the navigation apparatus.

In other words, the information distribution center consists of an apparatus which searches for a plurality of routes from a departure point to a destination, an apparatus which generates data for display for displaying a map of this plurality of routes, and an apparatus which distributes this data for display to the outside. And the data for display which is distributed from this information distribution center is received by the navigation apparatus, and a map of the plurality of pats from the departure point to the destination is displayed. With this type of map data distribution system, by executing the various procedures which have been explained above, it is possible to display the overlapped portions of the various routes in a manner which is easy to see by shifting them.

Figure 23:
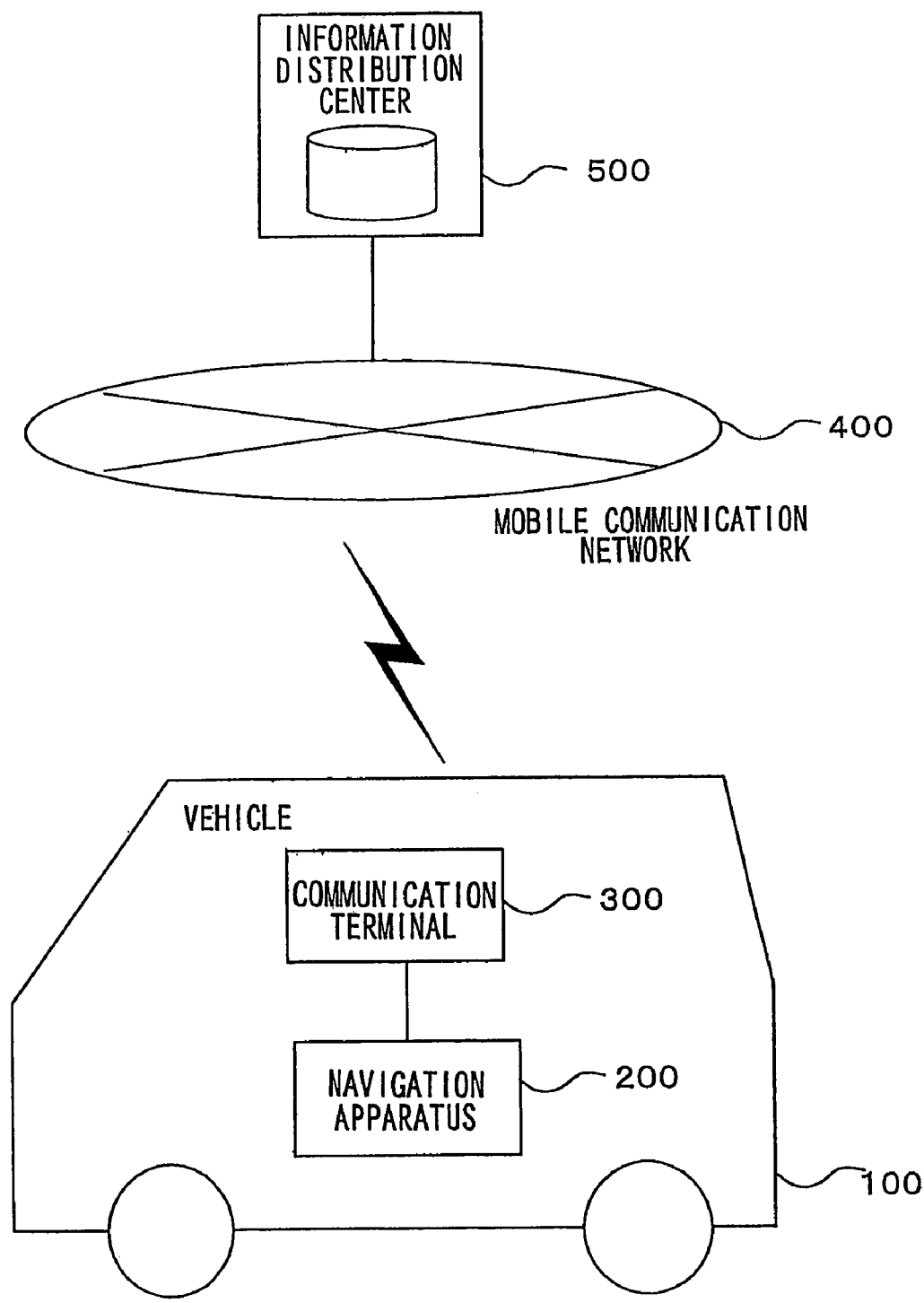
FIG. 23 is a figure showing a situation in which the present invention is applied to a communicating navigation system.

FIG. 23 is a figure illustrating this situation. A communication terminal 300 is connected to a navigation apparatus 200 which is fitted to a vehicle 100. A portable telephone or the like is used in this communication terminal 300. The communication terminal 300 is connected wirelessly to a mobile communication network 400. An information distribution center 500 is connected to the mobile communication network 400. In other words, the navigation apparatus 200 is connected to the information distribution center 500 via the communication terminal 300 and the mobile communication network 400. When the navigation apparatus 200 is connected to the information distribution center 500, it transmits a distribution request for the map data to the information distribution center 500. According to this distribution request, the information distribution center 500 performs the procedures detailed above, and distributes the map data to the navigation apparatus 200. The navigation apparatus 200 receives the map data which has been distributed from the information distribution center 500 via the mobile communication network 300 and the communication terminal 200. The present invention may be applied to this type of communicating navigation system as well.

Figure 24:
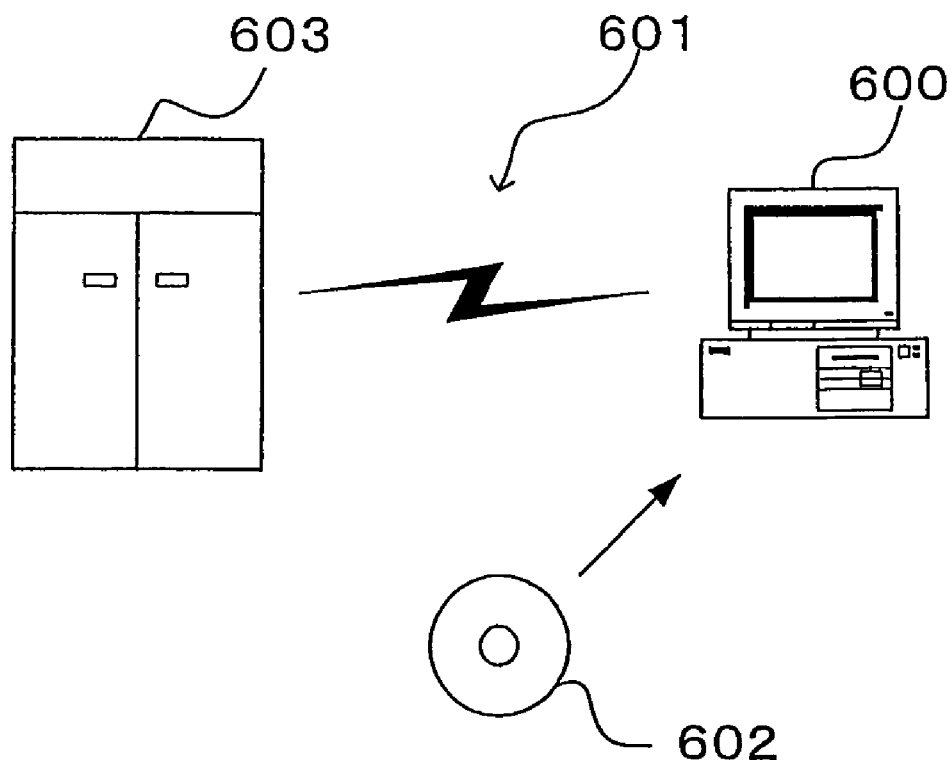
FIG. 24 is a figure showing a situation in which the present invention is applied to a personal computer.

It should be understood that, if the present invention is applied to a personal computer or the like, then it is possible to provide a program related to the above described type of control via a recording medium such as a CD-ROM or the like, or via an electrical communication channel such as the Internet or the like. FIG. 24 is a figure illustrating this situation. A personal computer 600 receives supply of a program via a CD-ROM 602. Furthermore, the personal computer 600 is endowed with a function of connection to a communication channel 601, so that the above described program may be supplied from a server 603. The communication channel 601 is a communication channel such as the internet, a personal computer link or the like, or is a dedicated communication channel or the like. The server 603 transmits the program via the communication channel 601 to the personal computer 600. In other words, it converts the program to a data signal upon a carrier wave, and transmits it via the communication channel 601. In this manner, the program may be supplied, in the form of a computer program product which can be read in by a computer, in various formats, such as a recording medium or a carrier wave or the like.

The present invention is not limited to the above described embodiments. Other modes which may be conceived of within the range of the technical concept of the present invention are also included within the range of the present invention.

What is claimed is:

1. A navigation apparatus, comprising:
   a route searching unit that searches for a plurality of routes from a departure point to a destination; and
   a map display control unit that displays a map of the plurality of routes searched out by the route searching unit upon a display monitor, wherein:
   if any two or more among the plurality of routes overlap upon and pass along a same road, the map display control unit displays the overlapping route portions as shifted.

2. A navigation apparatus according to claim 1, wherein:
   when displaying the overlapping portions as shifted, the map display control unit shifts an entirety of each of the overlapping routes with maintaining its original shape.

3. A navigation apparatus according to claim 2, wherein:
the map display control unit sets a shift width for each of the overlapping routes based upon coordinates of a center of gravity of each of the overlapping route.

4. A navigation apparatus according to claim 1, wherein:
when displaying the overlapping portions as shifted, the map display control unit shifts only the portions of the routes which overlap while not shifting portions other than the overlapping portions.

5. A navigation apparatus according to claim 4, wherein:
the map display control unit sets a shift width for each of the overlapping routes based upon an outward angle from the overlapping portion of each of the overlapping route or an inward angle towards the overlapping portion of each of the overlapping route.

6. A navigation apparatus according to claim 1, wherein:
when displaying the overlapping portions as shifted, the map display control unit shifts each of the routes by a predetermined width unit which is determined in advance.

7. A map data distribution apparatus, comprising:
a route searching unit that searches for a plurality of routes from a departure point to a destination;
a data generation unit that generates data for display, for displaying a map of the plurality of routes searched out by the route searching unit; and
a data distribution unit that distributes the data for display generated by the data generation unit, wherein:
if any two or more among the plurality of routes overlap upon and pass along a same road, the data generation unit generates the data for display while shifting the overlapping route portions.

8. A map data distribution apparatus according to claim 7, wherein:
when generating the data for display while shifting the overlapping portions, the data generation unit shifts an entirety of each of the overlapping routes with maintaining its original shape.

9. A map data distribution apparatus according to claim 8, wherein:
the data generation unit sets a shift width for each of the overlapping routes based upon coordinates of a center of gravity of each of the overlapping routes.

10. A map data distribution apparatus according to claim 7, wherein:
when generating the data for display while shifting the overlapping portions, the data generation unit shifts only the portions of the routes which overlap while not shifting portions other than the overlapping portions.

11. A map data distribution apparatus according to claim 10, wherein:
the data generation unit sets a shift width for each of the overlapping routes based upon an outward angle from the overlapping portion of each of the overlapping routes or upon an inward angle towards the overlapping portion of each of the overlapping routes.

12. A map data distribution apparatus according to claim 7, wherein:
when displaying the overlapping portions as shifted, the data generation unit shifts each of the routes by a predetermined width unit which is determined in advance.

13. A map data distribution system, comprising:
a map data distribution apparatus according to claim 7; and
a map display apparatus that receives the data for display and displays a map of the plurality of routes.

14. A map display method, comprising:
searching for a plurality of routes from a departure point to a destination; and
displaying a map of the plurality of routes which are searched out with the overlapping route portions as being shifted, if any two or more among the plurality of routes which have been searched out overlap upon and pass along the same road.

* * * * *